(12) United States Patent
Chang et al.

(10) Patent No.: US 8,255,819 B2
(45) Date of Patent: Aug. 28, 2012

(54) WEB NOTEBOOK TOOLS

(75) Inventors: Bay-Wei Chang, Foster City, CA (US);
Kushal Dave, New York, NY (US);
Robert Allen Ryskamp, Menlo Park, CA (US); Xiangtian Dai, Sunnyvale, CA (US); Paul Fontes, Mountain View, CA (US); Daniel M. Russell, Palo Alto, CA (US); Joseph M. Ashear, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 845 days.

(21) Appl. No.: 11/747,169

(22) Filed: May 10, 2007

(65) Prior Publication Data
US 2007/0266342 A1 Nov. 15, 2007

Related U.S. Application Data

(60) Provisional application No. 60/799,461, filed on May 10, 2006.

(51) Int. Cl.
*G06F 3/048* (2006.01)
(52) U.S. Cl. ........ 715/769; 715/760; 715/770; 715/808; 715/821; 715/823
(58) Field of Classification Search .................... 715/769
See application file for complete search history.

(56) References Cited

U.S. PATENT DOCUMENTS

| | | | |
|---|---|---|---|
| 5,515,496 A | 5/1996 | Kaehler et al. | |
| 5,760,773 A * | 6/1998 | Berman et al. | 715/808 |
| 6,119,135 A | 9/2000 | Helfman | |
| 6,460,038 B1 | 10/2002 | Khan et al. | |
| 6,522,342 B1 | 2/2003 | Gagnon et al. | |
| 6,631,496 B1 | 10/2003 | Li et al. | |
| 6,718,365 B1 | 4/2004 | Dutta | |
| 6,745,178 B1 | 6/2004 | Emens et al. | |
| 6,763,388 B1 | 7/2004 | Tsimelzon | |
| 6,763,399 B2 | 7/2004 | Margalit et al. | |
| 7,058,902 B2 * | 6/2006 | Iwema et al. | 715/810 |
| 7,206,839 B2 | 4/2007 | Ingram et al. | |
| 7,360,175 B2 * | 4/2008 | Gardner et al. | 715/854 |
| 7,478,336 B2 * | 1/2009 | Chen et al. | 715/770 |
| 7,503,012 B2 * | 3/2009 | Chen et al. | 715/769 |

(Continued)

FOREIGN PATENT DOCUMENTS

EP 1 030 247 8/2000
(Continued)

OTHER PUBLICATIONS

International Search Report & Written Opinion, PCT/US2007/068695, mailed Oct. 31, 2007 13 pages.

(Continued)

*Primary Examiner* — Alvin Tan
(74) *Attorney, Agent, or Firm* — Fish & Richardson P.C.

(57) ABSTRACT

A computer-implemented method of providing information for a web notebook is disclosed. The method can include displaying a web document in a content area of a browser window, receiving a user selection of content from the document initiated by a first user mouse click, and displaying a selection icon in the content area upon completion of the user selection, wherein the selection icon is displayed without the need for a second user mouse click.

35 Claims, 12 Drawing Sheets

U.S. PATENT DOCUMENTS

| | | | |
|---|---|---|---|
| 7,702,811 | B2 | 4/2010 | Gopalan et al. |
| 2001/0044834 | A1 | 11/2001 | Bradshaw et al. |
| 2004/0205493 | A1* | 10/2004 | Simpson et al. ........... 715/501.1 |
| 2004/0225716 | A1 | 11/2004 | Shamir et al. |
| 2005/0091609 | A1* | 4/2005 | Matthews et al. ............. 715/804 |
| 2005/0102630 | A1* | 5/2005 | Chen et al. .................... 715/770 |
| 2005/0154994 | A1* | 7/2005 | Chen et al. .................... 715/770 |
| 2005/0234904 | A1 | 10/2005 | Brill et al. |
| 2005/0246540 | A1 | 11/2005 | Brown |
| 2006/0026147 | A1 | 2/2006 | Cone et al. |
| 2006/0161859 | A1* | 7/2006 | Holecek et al. ............... 715/781 |
| 2006/0274086 | A1 | 12/2006 | Forstall et al. |
| 2006/0277460 | A1 | 12/2006 | Forstall et al. |
| 2007/0011146 | A1 | 1/2007 | Holbrook |
| 2007/0106952 | A1 | 5/2007 | Matas et al. |
| 2007/0266011 | A1 | 11/2007 | Rohrs et al. |
| 2007/0266022 | A1 | 11/2007 | Frumkin et al. |
| 2008/0046845 | A1 | 2/2008 | Chandra |
| 2008/0086471 | A1 | 4/2008 | Ritter et al. |
| 2008/0168388 | A1 | 7/2008 | Decker |
| 2008/0307301 | A1 | 12/2008 | Decker et al. |
| 2008/0307308 | A1 | 12/2008 | Sullivan et al. |
| 2009/0044138 | A1 | 2/2009 | Rudolph et al. |
| 2009/0119258 | A1 | 5/2009 | Petty |
| 2011/0082849 | A1 | 4/2011 | Rakowski et al. |

FOREIGN PATENT DOCUMENTS

| | | |
|---|---|---|
| WO | WO 01/16807 | 3/2001 |

OTHER PUBLICATIONS

International Preliminary Report on Patentability & Written Opinion, PCT/US2007/068695, mailed Nov. 20, 2008, 8 pages.

International Search Report & Written Opinion, PCT/US2007/068662, mailed Jun. 11, 2007, 12 pages.

International Preliminary Report on Patentability & Written Opinion, PCT/US2007/068662, mailed Nov. 20, 2008, 7 pages.

International Search Report & Written Opinion, PCT/US2007/068709, mailed Nov. 8, 2007, 14 pages.

International Preliminary Report on Patentability & Written Opinion, PCT/US2007/068709, mailed Nov. 20, 2008, 8 pages.

Amazon Screenshot, So You'd Like to . . . Create a Guide, Retrieved from Internet, [retrieved on Mar. 22, 2006] 2 pages.

Amazon.com, Inc., Amazon Listmania, Copyright 1995-2005, [online], [retrieved on Mar. 22, 2006] Retrieved from Amazon.com using Internet <URL: http://www.amazon.com/gp/help/customer/display.html?nodeId=14279651> 8 pages.

Backpack Publish Firefox Extension << Slow Burn Productions [online], [retrieved Jul. 16, 2007] Retrieved from Internet <URL: http://slowburnproductions.wordpress.com/2007/04/25/backpack-publish-firefox-extension> 4 pages.

Citebite—Link directly to specific quotes in web pages [online], [retrieved Jul. 16, 2007] Retrieved from Internet <URL: http://www.citebite.com> 2 pages.

Clipmarks—Learn More [online], [retrieved Jul. 16, 2007] Retrieved from Internet <URL: http://www.clipmarks.com/learn-more> 4 pages.

Cogitum, L.C., Cogitum Co-Citer , Copyright 2000-2006, [online], [retrieved on Mar. 22, 2006] Retrieved from Cogitum, L.C. using Internet <URL: http://www.cogitum.com/co-tracker-text/more.shtml> 2 pages.

Dabble Video Search Launchpad [online], [retrieved Jul. 16, 2007] Retrieved from Internet <URL: http://www.http://dabble.com> 2 pages.

Diigo—Social Annotation: Seamless Integration of Social Bookmarking, Web Highlighter, Sticky-Note & Clipping [online], [retrieved Jul. 16, 2007] Retrieved from Internet <URL: http://www.diigo.com> 3 pages.

eSnips—Make your life easier with eSnips Uploader [online], [retrieved Jul. 16, 2007] Retrieved from Internet <URL: http://www.esnips.com/tour/page8.jsp>1 page.

EverNote—A single place for all your notes! [online], [retrieved Jul. 16, 2007] Retrieved from Internet <URL: http://www.evernote.com/en>, 2 pages.

EverNote Corporation, EverNote products, Copyright 2006, [online], [retrieved on Mar. 22, 2006] Retrieved from EverNote Corporation using Internet <URL: http://www.evernote.com/en/products/evernote/features.php> 7 pages.

EverNote Corporation, User Manual for EverNotes Plus, Copyright 2005, [online], [retrieved on Mar. 22, 2006] Retrieved from EverNote Corporation using Internet <URL: http://www.evernote.com/en/products/evernote/features.php> 2 pages.

Fleck.com—Fleck the Web! [online], [retrieved Jul. 16, 2007] Retrieved from Internet <URL: http://fleck.com> 2 pages.

Giles-Peters, Andrew, ScrapBook: A Firefox extension for gathering information from the web, Dec. 2005, [online], [retrieved on Mar. 22, 2006] Retrieved from Mozilla using Internet <URL: http://www.mozilla.com/en-US/firefox/central/> 55 pages.

Google Shopping List [online], [retrieved on Jun. 18, 2007] Retrieved from Internet <URL: http://froogle.com/shoppinglist>1 page.

i-Lighter :: the yellow highlighter for the web [online], [retrieved Jul. 16, 2007] Retrieved from Internet <URL: http://www.i-lighter.com> 2 pages.

Jeteye—How to Create Your First Jetpak Jeteye.com [online], [retrieved Jul. 16, 2007] Retrieved from Internet <URL: http://www.jeteye.com/jetpak/5e065b9d-db01-4b66-a523-0f6c4667b8cf> 2 pages.

Jeteye Technologies, Inc., Jeteye beta tour, Copyright 2005, [online], [retrieved on Mar. 22, 2006] Retrieved from Jeteye Technologies, Inc. using Internet <URL: http://www.jeteye.com/>. 1 page.

Kaboodle—Organize [online], [retrieved Jul. 13, 2007] Retrieved from Internet <URL: http://www.kaboodle.com/ht/img/hom/promo2.gif> 1 page.

Kaboodle—Shopping is more fun with friends [online], [retrieved Jul. 16, 2007] Retrieved from Internet <URL: http://www.kaboodle.com> , 4 pages.

Kaboodle, Inc, Kaboodle , Copyright 2006, [online], [retrieved on Mar. 22, 2006] Retrieved from Kaboodle.com using Internet <URL: http://www.kaboodle.com/zd/help/learnhow.html> 5 pages.

Koonji—How to Use it [online], [retrieved on Aug. 31, 2007] Retrieved from Kaboodle.com using Internet <URL: http://www.koonji.com/learnMore.htm, 9 pages.

Lifehacker—Create a store and earn commissions with Zlio—Lifehacker [online], [retrieved Jul. 16, 2007] Retrieved from Internet <URL: http://www.lifehacker.com/software/sales/creat-a-stor-and-earn-commissions-with-zlio-234655.php> 7 pages.

Macropool GmbH, Content Saver , Copyright 2006, [online], [retrieved on Mar. 22, 2006] Retrieved from Macropool GmbH using Internet <URL: http://www.macropool.com/en/products/contentsaver/index.html> 2 pages.

Microsoft Corporation, How to change the placement of your notes in OneNote 2003, Last Review date Aug. 5, 2004, Copyright 2006, [online], [retrieved on Mar. 22, 2006] Retrieved from Microsoft Corporation using Internet <URL: http://support.microsoft.com/kb/822567> 3 pages.

Microsoft Corporation, Onfolio Add-in for Windows Live Toolbar, Copyright 2002-2006, [online], [retrieved on Mar. 22, 2006] Retrieved from Microsoft Corporation using Internet <URL: http://www.onfolio.com/product/toolbaraddin/> 2 pages.

Net Snippets Ltd, Net Snippets Maximizing Online Research , Copyright 2001-2005, [online], [retrieved on Mar. 22, 2006] Retrieved from Net Snippets Ltd using Internet <URL: http://www.netsnippets.com/professional.htm> 4 pages.

Notemark: Your Personal Save Engine, [online], [retrieved on Jul. 16, 2007] Retrieved from Notemark using Internet <URL: http://www.notemark.com/how_it_works.php> 8 pages.

Omni Group—OmniOutliner [online], [retrieved Jul. 16, 2007] Retrieved from Internet <URL: http://www.omnigroup.com/applications/omnioutliner> 5 pages.

Plum Ventures, Inc., Plum, Copyright 2006, [online], [retrieved on Mar. 22, 2006] Retrieved from Plum Ventures, Inc. using Internet <URL: http://www.plum.com/help.plum>12 pages.

Plum: Welcome to Plum [online], [retrieved Jul. 16, 2007] Retrieved from Internet <URL: http://www.plum.com> 2 pages.

PreFound—Download PFfinder [online], [retrieved Jul. 16, 2007] Retrieved from Internet <URL: http://www.prefound.com/pffinder.php> 2 pages.

SharedCopy [online], [retrieved Jul. 16, 2007] Retrieved from Internet <URL: http://www.sharedcopy.com> 16 pages.

Stickis [online], [retrieved Jul. 16, 2007] Retrieved from Internet <URL: http://www.stickis.com> 1 page.

Summarizing Personal Web Browsing Sessions [online], [retrieved Jul. 16, 2007] Retrieved from Internet <URL: http://www.cs.washington.edu/homes/mirad/research/summaries> 2 pages.

Tably [online], [retrieved Jul. 16, 2007] Retrieved from Internet <URL: http://www.tably.com/defaulttab.asp> 1 page.

Trailfire [online], [retrieved Jul. 16, 2007] Retrieved from Internet <URL: http://www.trailfire.com> 4 pages.

Tucows Downloads—WebStasher 1.5 Shareware Software [online], [retrieved Jun. 18, 2007] Retrieved from Internet <URL: http://www.tucows.com/preview/319605>, 5 pages.

Uhuroo—Help Kaboodle [online], [retrieved Jul. 16, 2007] Retrieved from Internet <URL: http://www.uhuroo.com/uweb/html/help/htm> 5 pages.

WebWorkshop—Google's PageRank Explained [online], [retrieved Mar. 23, 2006] Retrieved from Internet <URL: http://webworkshop.net/pagerank.html?prn=y, 15 pages.

Welcome to webOutliner [online], [retrieved Jul. 16, 2007] Retrieved from Internet <URL: http://www.weboutliner.com> 2 pages.

Wists, Wists social shopping beta, [online], [retrieved on Mar. 22, 2006] Retrieved from wists.com Internet <URL: www.wists.com> 3 pages.

Wridea [online], [retrieved Jul. 16, 2007] Retrieved from Internet <URL: http://www.wridea.com> 3 pages.

Yoono, People Powered [online], [retrieved Jul. 16, 2007] Retrieved from Internet <URL: http://www.yoono.com/index.jsp> 1 page.

Zoho Notebook Press Release [online], [retrieved Aug. 31, 2007] Retrieved from Internet <URL: http://mashable.com/2007/05/21/zoho-notbook > 1 page.

Zotero—The Next-Generation Research Tool [online], [retrieved Jul. 16, 2007] Retrieved from Internet <URL: http://www.zotero.org>, 5 pages.

Manber, U. "Creating a Personal Web Notebook," *Proceedings of the Usenix Symposium on Internet Technologies and Systems*, Dec. 11, 1997, pp. 183-191, Monterey, CA, USA, Retrieved from the Internet: URL: http://www.usenix.org/publications/library/proceedings/usits97/full_papers/manber_creating/manber_creating.pdf .[retrieved on Oct. 24, 2007] abstract.

Reimer, Y. J. et al., "Implementation Challenges Associated with Developing a Web-based E-notebook," *Journal of Digital Information* [Online] vol. 4, No. 3, 2004, ISSN: 1368-7506, Retrieved from the Internet URL: http://jodi.ecs.soton.ac.uk/Articles/v04/i03/JacobsReimer/. [retrieved on Oct. 24, 2007] section 3 "NetNotes: A Web-based E-notebook".

Sugiura, A. et al. "Internet Scrapbook: Automating Web Browsing Tasks by Demonstration," *Proceedings of the 11th Annual Symposium on User Interface Software and Technology*, Nov. 1-4, 1998, pp. 9-18, San Francisco, CA, USA, ISBN: 1-58113-034-1.

Engst, A.C., "Internet Explorer 5.0 Redisplays the Web," Internet Article [Online] Mar. 27, 2000, Retrieved from the Internet: URL: http://db.tidbits.com/article/5872> [retrieved on Oct. 25, 2007] Paragraph titled "Keeping a Scrapbook".

"Bluebell—Internet Scrapbook-1U5" Internet Article [Online] Feb. 26, 2002, Retrieved from the Internet: URL: http://www.download32.com/bluebell---internet-scrapbook--i22878.html> [retrieved on Oct. 25, 2007]

European Patent Office Action, EP 07 762 103.5, mailed Mar. 18, 2009, 4 pages.

Notification of First Office Action, Chinese Appl. No. 200780026084.4, issued Jul. 12, 2010, 24 pages.

CN Office Action in Application No. 200780026182.8, mailed Nov. 22, 2010, 14 pages.

Susan Dumais et al. "Stuff I've Seen: A System for Personal Information Retrieval and Re-Use," Microsoft Research, Redmond, WA, 2003, 8 pages.

Notification of Second Office Action, Chinese Appl. No. 200780026084.4, issued Apr. 14, 2011, 26 pages.

Decision on Rejection, Chinese Appl. No. 200780026084.4, issued Sep. 21, 2011, 18 pages.

European Examination Report, EP 07 783 616.1, mailed Jan. 4, 2012, 4 pages.

CN Office Action in Application No. 200780026182.8, issued Nov. 23, 2011, 17 pages.

\* cited by examiner

All Notes  »

- ✗ new digital cameras
- ✗ arthritis info
- ✗ autism
- ✗ webex
- ✗ my New Zealand Vacation Create a new note... — 528

520

--- new digital cameras  ↗

- ▲ Sony T-series
- ▲ Digital Cameras - ... Sony T7
- ▲ Sony t7 Froogle - Sony
- ▲ HP R607 and R507
- ▲ Steves Digicams - ... - The
- ▲ HP Photosmart R50...

Type in a new entry here...

[<<History]  [Refresh]

WEB NOTEBOOK TOOLS

CROSS-REFERENCE TO RELATED APPLICATIONS

This document claims the benefit of prior U.S. provisional application 60/799,461, filed May 10, 2006.

TECHNICAL FIELD

This document relates to managing and accessing data relating to online notebooks.

BACKGROUND

Surfers of the World Wide Web can locate all forms of information, from travel guides to restaurant home pages. Effective search engines can help a user find the best or most relevant of all such web pages. The user may then click on search results and be taken to the web pages, where the user may then navigate to find particularly helpful information. After browsing content from various sources, the user may wish to return to content previously accessed. To do so, the user may employ a "history" or "favorites" feature of a browser running on the client device. However, the user will need to re-navigate the information—perhaps passing again through irrelevant or unwanted information to get to the desired information.

Web notebooks may allow a web surfer to further organize web-based information. A web notebook is an electronic document in which a user has compiled portions of content from various other web documents, and where the document contains references back to the originating web document (e.g., so that users may navigate from the notebook back to the originating web documents, such as web pages).

A web user may form a web notebook by selecting content relating to a particular topic as he or she surfs the web. For example, someone planning to build a new home may create a web notebook related to homebuilding by surfing to a number of web sites of hardware (e.g., plumbing, lighting, etc.) manufacturers and selecting content from each manufacturer to be compiled in the web notebook. In this way, the user may be provided with a convenient location in which to store and review content on a particular topic relatively easily.

SUMMARY

This document discusses methods and systems for obtaining content for a web notebook or other similar item. In general, a background application, which can be an application or part of an application not normally visible to a user, operates on a system, such as a system running a web browser application. The background application may monitor activity in an active display area of the browser window for content selection by a user, and may generate a visible icon when content selection has occurred (e.g., by a mouse button press, followed by dragging, followed by a pause). Selection of the icon may cause the selected content to be clipped to a web notebook automatically. The icon may be generated to be displayed at or near the point at which the content selection ends, so that the user may very easily select the control without having to move the pointer very far to make the selection.

In some implementations, a computer-implemented method of providing information for a web notebook includes displaying a web document in a content area of a browser window; receiving a user selection of content from the web document initiated by a first user-initiated mouse click; and displaying a selection icon in the content area upon completion of the user selection, wherein the selection icon is displayed without the need for a second user-initiated mouse click.

The user selection of content can include a user-initiated mouse click followed by a user-initiated dragging selection of an area of content. The selected content can be copied to a web notebook. The selected content can be appended to a web notebook containing content from other web pages. The selection icon can be displayed adjacent to a final selection point of the user selection of content.

In some implementations, the first icon can be replaced with a second icon that is different than the first icon after a pointer hovers over the first icon for a predetermined period of time. In some implementations, the selection icon includes a first icon and a second icon displayed adjacent to the first icon, and the second icon can be displayed when a pointer hovers over the first icon.

In some implementations, the computer-implemented further includes receiving a user activation of the icon and copying the selected content to a web notebook in response to the user activation. In some implementations, the computer-implemented method further includes selecting the web notebook from a plurality of web notebooks by comparing the selected content to content in the plurality of web notebooks.

In some implementations, a method of clipping web page content to a web notebook includes displaying web page content in a browser content area; receiving a click-and-drag command from a pointing device; detecting the end of the click-and-drag command at a location in the browser content area; and displaying a content selection icon without the need for a pointer-device down click.

In some implementations, a method of clipping web page content to a web notebook includes determining that a click-and-drag content selection operation has occurred in a content area of a web browser; detecting an end-of-selection indication; determining a pointer location when the end-of-selection indication occurs; and displaying a content selection icon adjacent to the pointer location, wherein activation of the content selection icon causes content selected by the content selection operation to be copied to a web notebook. The detected end-of-selection indication can include a pointer up-click event. The method can be performed by instructions stored in a web browser extension.

In some implementations, a method of capturing data from a plurality of web documents includes displaying a web document in a first web browser window; receiving a selection of content from within the displayed web document that is substantially less than all of the content in the displayed web document; and displaying a web document portion or a web document connector associated with the selected content in an active content area of a second web browser window.

The second browser window can be a frame or region displayed within the first web browser window. A web document portion can include a snippet of text contained in the selected content. A web document portion can include an image contained in the selected content. A web document connector can include a link to the web document comprising the selected content.

In some implementations, the method can further include storing the web content in a document with content from a plurality of web pages. In some implementations, the method can further include displaying a plurality of web document portions, each associated with corresponding content selected from a different web document. In some implementations, the method can further include receiving a selection of a web document connector and displaying the selected content in response to the selection. Displaying the selected content can include displaying the selected content separately from its corresponding web document. Displaying the selected content can include externally referencing up-to-date content from the corresponding web document. Externally referencing up-to-date content can include analyzing pointers in a web notebook that is displayed in the second web browser window.

In some implementations, a method of presenting content associated with a web notebook can include obtaining content stored in a web notebook, the content representing sub-portions of a plurality of different web pages; externally referencing up-to-date content from each of the plurality of different web pages; and populating the web notebook with the up-to-date content from each of the plurality of different web pages.

Some implementations may provide for one or more advantages. For example, there may be more room to display actual web content in a web browser when a content selection feature is provided as a background application that does not provide any visible elements until they are needed. In particular, areas that would otherwise be dedicated to persistent menus may be decreased in number or size, or may be eliminated. In addition, placing an icon near the end of a selection area may provide for more efficient interaction with a computer, since selection of control/icon can be accomplished with small movements. Also, operation of the system and the method may be greatly simplified from a user's point of view because placing the button spatially near the content selection may also suggest that it is conceptually related to the selection action, so that users may more readily associate it with clipping of selected content.

Some implementations may provide for one or more additional advantages. The provision of a window for accepting and displaying entries from web notebooks may provide a convenient area in which a web surfer may review a notebook even as it grows. Such a window may be made relatively small compared to the active content area of a browser, and may thus provide for interaction between a surfer and a web notebook application without interfering substantially with the user's browsing experience. In addition, where the surf-along window is within the boundary of the browser application window, it may be shown persistently and may move with the browser application window. In addition, it may be minimized within the window or its display may be changed to affect its size and useability.

Some implementations may provide for one or more additional advantages. Provision of active content in a notebook may enable users to more readily capture more content for a web notebook and thereby make a notebook more complete. In addition, web notebooks may be easily created and may remain accurate even where captured content is changing.

The details of one or more implementations are set forth in the accompanying drawings and the description below. Other features, objects, and advantages will be apparent from the description and drawings, and from the claims.

DESCRIPTION OF DRAWINGS

FIGS. 5A-5C show different forms of surf-along windows for displaying captured web notebook content.

FIG. 9 is a screen shot of a web notebook manager display.

FIG. 10 is a screen shot showing a web notebook surf-along window implementation.

Like reference symbols in the various drawings indicate like elements.

DETAILED DESCRIPTION

Figure 1:
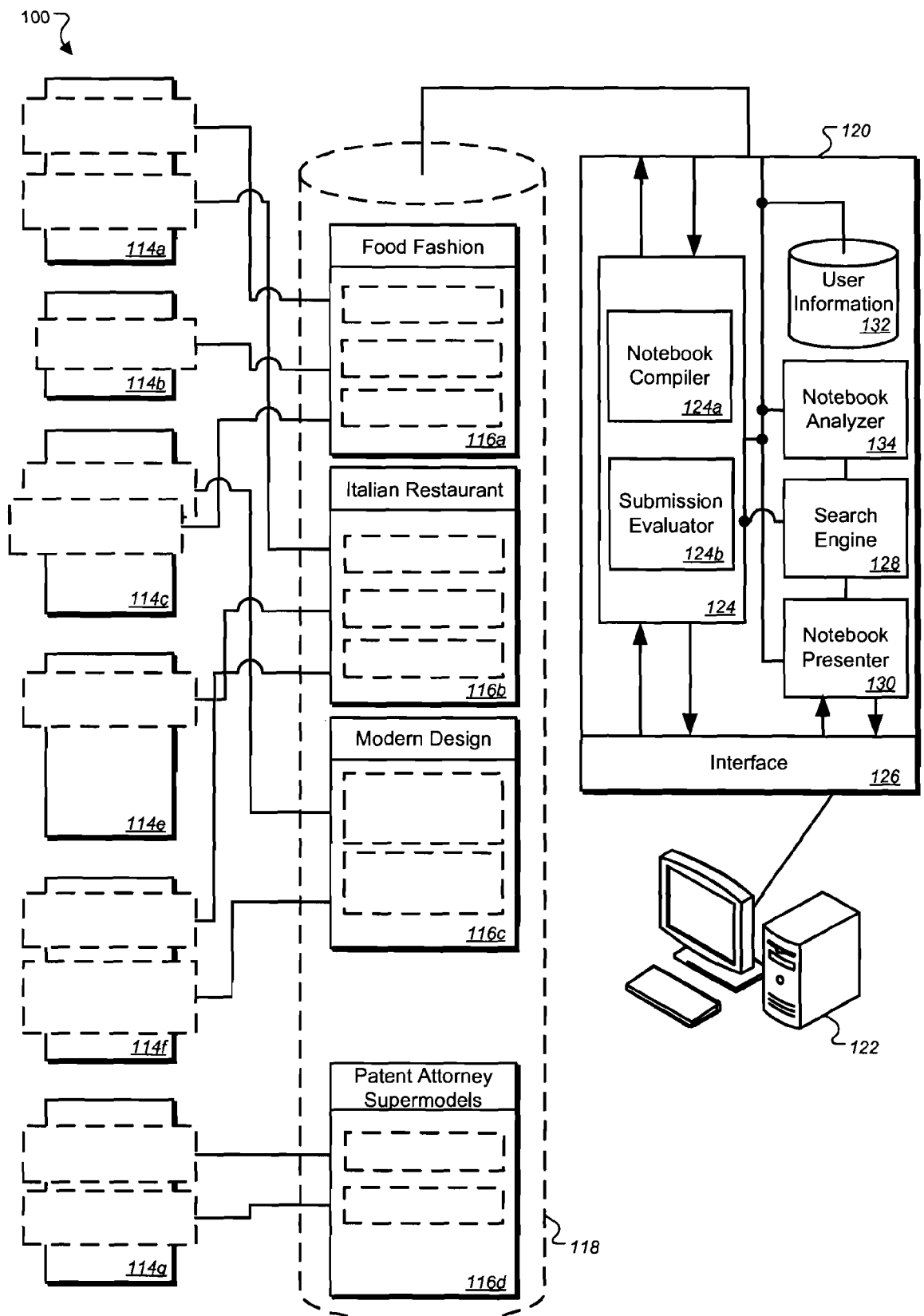
FIG. 1 is a schematic diagram of a system for organizing web-based content in web notebooks.

FIG. 1 is a schematic diagram of a system 100 for organizing web-based content in web notebooks. In general, the system 100 organizes notebooks 116a-116d in notebook database 118 when users of system 100 select content from web pages 114a-114g. Notebook manager 120 contains components to permit creation, modification, and management of notebooks, and access to the notebooks by users and others. As pictured, the system 100 uses a hosted notebook arrangement, i.e., one in which at least a substantial portion of the notebook information is stored on one or more central servers rather than being stored at each user's computer. In other implementations, the system can have a different arrangement (e.g., a distributed arrangement).

The web pages 114a-114g and notebooks 116a-116d show two exemplary ways to present web content. The web pages 114a-114g are prepared, for example, by various third parties and are located by users of the system 100, for example, by browsing the web. The notebooks 116a-116d are compiled documents prepared by users of the system, and are, in essence, conglomerations or compilations of other information from various sources that the users grouped together. They are compiled in the sense that some or all of their content may originate from other sources, such as web pages. For example, a user may compile a web notebook to include information from various retail stores' web pages showing store hours for Black Friday—the day after Thanksgiving.

Such compiled content may be more helpful to readers than would be links to the retailers' own web pages because the notebook allows review of the information in a single page, without the need for navigating between and among various pages. In addition, in normal situations, links might not take the viewer directly to the relevant content—even if the links lead to areas within a web page—because the viewer may be distracted by information they see around the relevant content. By clipping a portion of the web page content, a notebook author may provide only the information that is needed for their purposes.

Notebooks 116a-116d are typically created by a user navigating to various web pages and clipping pieces of content from some of the web pages. As described below, the clipped content may then be pasted or dropped (in various manners—both manual and automatic) into web notebooks. Though shown as web pages 114a-114g, the documents may take the form of any appropriate network-accessible document, such as other documents authored in a markup language. Examples of such possible formats include SGML, XML, TeX, and XHTML, to name a few.

The web pages 114a-114g may contain a variety of appropriate content. For example, web page 114a may be a page for a gourmet Italian restaurant, while page 114b may be a web page of a food photographer. Page 114c may be a page for an Art Deco restaurant, while web page 114e may also be for an Italian restaurant. Web page 114f may be for a modern Italian restaurant, while web page 114g may be a page of a patent law firm.

Connecting lines show correspondence between content taken from web pages 114a-114g, and web notebooks 116a-116d. For example, a user who enjoys nice looking food may browse web sites such as restaurant web site 114a and others, and may select photographs from those web sites to show together on the users' notebook page. Likewise, a user who creates notebook 116b may be a fan of Italian cuisine, and may thus clip content from a variety of Italian restaurant web pages in an area to provide a combined page that shows the best restaurants in the area (at least according to the user). For example, page 114c might be the web site for a high-end Italian restaurant, with pictures of beautifully presented food. A user creating notebook 116b may have placed a portion (e.g., a menu and address) of the page in a notebook they have captioned "Italian Restaurants" and another user (of notebook 116a) may have placed another portion (e.g., a photo of a beautiful cannoli) on a "Food Fashion"—captioned notebook Each dashed box in the figure represents content from the web pages 114a-114g that has been captured by users of the system into notebooks 116a-116d. The boxes are shown in a rectangular shape consistent with many standard approaches for content selection, although content may be selected in any appropriate manner by a user. Such content may be captured in a variety of manners. For example, users may drag a mouse across content in a web page, in a well-known manner, or a computer system may default to selecting content with particular markup tags (e.g., heading tags) and select that content automatically, or semi-automatically (e.g., selecting the content, but giving the user the right to approve the clipping of the content). In particular, for example, a notebook author may be an artist looking for pictorial inspiration, and may configure a notebook application to select only images for clipping to a notebook. In such a situation, all images on a page may be selected and clipped whenever the user makes a clipping command; the user may then be given the option at that point to discard some figures, or may return to the notebook later and delete any figures they did not want clipped to the notebook.

As another example, a user may be looking only to make an outline in a web notebook, and the user may configure the notebook application such that any selection clips only the titles or headings from a group of selected content (or clips all titles and headings if no content is currently selected). After browsing a number of web sites and selecting content, the user can then view the notebook, find interesting headings or title, and use controls in the notebook application to return to the corresponding web pages to collect additional content.

In addition, the system may search for custom tags that a web page author places in the page to guide clipping, e.g., "overview" tags that mark the beginning and the end of information that summarizes the content of a page. Also, a standard may define such special tags in various manners, such as "vertically" for specific types of web sites, e.g., financial, travel, etc., or for other uses. Allowing such custom definition of tags may permit the system to be extensible to more uses, and thus more helpful to users of system 100 and operators of system 100.

Information in addition to the clipped material may appear in notebooks 116a-116d. For example, users may use controls in a notebook development application to add headings, sub-headings, comments, and text that they have prepared themselves to the notebook. Users may also add metadata to a notebook, such as identification of the notebook type, the user who created the notebook, users who may access the notebook, and the level of access allowed (e.g., whether the notebook is to be public, private or semi-private (for example, accessible from a few identified user accounts)).

Various forms of information may be stored in notebooks 116a-116d. For example, HTML or other markup code itself may be stored, and various clippings may simply be set in sequence in the document. Alternatively, clippings or notes may be stored individually, and may also be pointed to by placeholders in a notebook.

Metadata about particular entries in a notebook may also be stored. The metadata may include the URL from which the material was clipped, the time/date it was clipped, indicators of the amount of content in a web page before and after the content that is clipped (e.g., so that one could return to the web page later and determine where the material came from in the page even if the material itself has changed in the interim), information about a corresponding search query (e.g., search query terms, search results, a link to a particular page of results or specific result associated with a notebook or notebook entry, etc.).

Although the notebooks may be stored locally on user computers such as terminal 122, they are shown here stored in a hosted system. Storing the notebooks 116a-116d in a hosted format may provide a number of advantages. For example, hosted documents can be made available to the public more easily. Hosted documents can also be updated in real time or near real time as information in the "source" web page changes. Hosted documents can be accessed by a user from a number of networked machines-such as machines at airports, cyber cafes and the like.

In addition, a hosting system such as notebook manager 120, which may be comprised of a combination of hardware (e.g., servers) and software for performing functions described in more detail below, may in appropriate circumstances perform more functions on a hosted set of notebooks than would be permitted if the notebooks were not stored centrally. For example, the manager 120 may be configured to search the content in the notebooks 116a-116d to return search results for other users, or may analyze content in notebooks to identify indicators of popularity or recent activity with respect to notebooks to obtain indicators of recent popularity.

A manager 120 in a hosted system may also look at connections in notebooks to improve general search results. For example, where a third-party user conducts a search for "Italian restaurants" or a similar concept, the search ranking or score of pages 114a, 114e, and 114f may be elevated relevant to other pages because they are referenced in a notebook captioned "Italian Restaurants." The elevation may occur under an assumption that the user who created notebook 116b was attempting to classify certain material, that the person selected an accurately descriptive heading or sub-heading, and that the page has thus been determined by a real person who is savvy enough to form a web notebook so as to be related to that term, and by extension to the search term.

In one implementation, each notebook may be stored as a separate markup document, or each note may be stored as a separate markup file, or other sort of file. Such options may be provided as alternatives or in combinations. One or more notebook indices may point to the notes or notebooks to permit organization and navigation of the notebooks. For example, an index may include a table containing a number of URLs associated with a particular user, so that when the user is accessing the system, links to each of the notebooks may be shown. Likewise, users may search the index to find information on various other users. The index may be stored, for example, with other information relating to users and/or notebooks.

Notebook content may also be shared, if a notebook author chooses to share his or her content. The sharing may be public so that any approved user of the system may see a notebook, or it may be less public, such that access is provided only to a group of approved users (e.g., friends or friends-of-friends) such as a social network or a group of users having special access privileges to a part of a system. In addition, the access may be structured so that other users can have read-only privileges, annotating or comment privileges, or full editorial privileges. Access control, in some implementations, can be provided by associating notebooks with specific user accounts that are accessibly only through a login process.

Particular global searches of the index may also be performed. For example, the system 100 may store information about which notebooks are most popular with other users, such as through a rating system or through a number of users accessing the notebooks. As a derivative measure, the system 100 may also track the popularity of certain notebook authors. The system 100 may then generate lists of popular notebooks or popular notebook authors for others to see. In addition, the lists may be limited to particular topics, such as most popular notebooks in a particular category (e.g., restaurant notebooks). Such lists and other analytical information about the notebooks may be shown on a web page that may be accessed by users attempting to browse the notebooks in notebooks database 118.

Notebook manager 120 shows an exemplary system (which may be a sub-system of a larger system) that can be used to create, manage, analyze, and deliver web notebooks. Components of notebook manager 120 allow it to store notebooks for various users in notebook database 118, to add content submitted by users to those notebooks, to search notebooks that match queries provided by users, to transmit requested notebooks for display to users, and other appropriate functions.

Notebook manager 120 communicates with the users, such as a user at terminal 122, through interface 126. Although not shown for clarity, a variety of communications components arranged in networks, such as a LAN, WAN, or the Internet, may be situated between terminal 122 and interface 126 in known manners. Interface 126 may be or include, for example, one or more web servers.

Notebook presenter 130 formats notebooks for display to users who have requested notebooks. Notebook presenter 130 may communicate with notebook database 118 to obtain notebook information where the notebook information is stored in a form other than as a complete notebook. Where notebooks are stored as multiple pieces or documents, notebook presenter 130 may access the parts that make up a notebook, and may combine and format them for presentation as a complete notebook to a user. For example, a notebook outline document may contain pointers to various notebook entries, and the notebook presenter 130 may read each pointer to determine which entries to add to the notebook so as to obtain all relevant notebook entries stored in database 118. Notebook presenter 130 may then transmit the completed notebook to a user through interface 126.

Entries in a notebook or notebook outline document may also contain pointers to web pages outside of notebook database 118. Such pointers may be used, for example, when a notebook is intended to store information from web pages that change over time. Such information could include, in one example, the current temperatures in certain areas, such as in locations shown in a notebook dedicated to travel.

Because notebooks will generally use only a portion of the content in a web page, there may be challenges in locating the appropriate content when a web page has changed. For example, if a notebook author clips a paragraph from the middle of a page, and the page is later edited to substantially change the material on each side of the clipped paragraph (or change the paragraph itself), it may be difficult to locate the paragraph automatically among all the changes so as to permit updating of the paragraph in the notebook.

A number of techniques may be used to help ensure that the same content is accessed each time even as values associated with the content change. For example, the position of the content in a web page may be determined (e.g., by determining the number of characters, words, or bytes into the page the content occurs, or by a position relative to another object such as a particular tag), as may tags that mark the beginning and end of the content. If tags appear at or near the same locations in the revised page as they were computed to occur in the original page, the system may assume that the proper content has been located in the revised page. In addition, tags on each side of the content may also be stored, and the location of the changed content may be checked against the location of the tags. Tags such as link tags may be particularly appropriate for such a determination, as they may indicate an anchor point for the page to which the web page author presumably intended to focus attention.

If the above-described determinations do not result in a sufficiently high level of confidence (which may be determined according to a scoring system that tallies all indicators that suggest the selection is proper) to permit system 100 to determine that the appropriate content in a page has been located, other determinations may be made. For example, system 100 may store certain metrics about a page when content is initially clipped—such as the total size of the page, the number of words in the page, the number and position of images in the page, and the number and type of other objects in the page. These metrics may be compared against the revised page to determine whether the page has changed so much that the notebooked content cannot be located with sufficient confidence.

When the content can be located, the system 100 may initially identify various candidates for the content (such as by comparing keywords in other content in the notebook, and comparing to keywords in the changed web page) and produce a score for each candidate by comparing the revised page with the particular candidate against whatever metrics the system has stored for the page. As a simplified example, if a notebook is titled "model race cars" and only one paragraph in the changed web page says anything about cars or models, that paragraph may be assumed to be the relevant content (along with any heading that might exist for the paragraph). The content included in the notebook may then be the candidate content with the highest score. If no such content is identified, viewers of the notebook may be provided with an appropriate message, such as a message asking the user to select the proper content from several candidates, or an error message.

Returning now to the components of notebook manager 120, notebook presenter 130 may use information stored in user information database 132 in preparing notebooks for transmission to users. For example, user information database 132 may store verification information about users. In such implementations, when a user requests access to a notebook, notebook presenter 130 may determine whether that user has access to the notebook, such as by checking access information stored in user information database 132.

User information database 132 can also store other information for the proper operation of notebook manager 120. For example, database 132 can include information for organizing notebooks, such as tables representing notebooks and pointers to documents that are entries or notes in the notebooks. Also, database 132 can store metadata about notebooks and notebook entries, including the author of a notebook, the time at which an entry was added to a notebook, the source of an entry, the size of an entry, and other pertinent information needed to manage notebooks and notebook entries.

Search engine 128 can be used by notebook presenter 130 to obtain information in response to queries from users. For example, search engine 128 may be in the form of a standard search engine such as a search engine that ranks documents according to their backlink relationships, and may search for information in notebooks 116a-116d. User queries can be in the form of search terms that are be applied to the corpus of content in database 118. For example, users may search for all notebooks containing content about Hawaiian vacations, and the search engine 128 may look for indicators of such content, such as the words "Hawaiian" and "vacation," related words such as "lei" and "leisure," and links to pages containing such terms. Likewise, users may search for information about patent attorneys, and may be provided in response a link to notebook 116d. If such a user selects a link, he or she may then be presented with a corresponding notebook. The content within the notebook 116d may include hyperlinks directed to web page 114g, so that if the user selects such a link, he or she may be provided with a display of the web page.

Search engine 128 may also be used for purposes other than searching of notebooks. For example, notebook manager 120 may submit queries, along with appropriate parameters (such as pointers to particular indices) to a standard search engine and may receive search results from the general search engine. In such a manner, an organization may leverage the operation of a general search engine to include searching relating to web notebooks.

Notebook formatter 124 may serve to receive requests from users to start new notebooks, and to add content to existing notebooks. Submission evaluator 124b within notebook formatter 124 can receive information from interface 126, and may parse and analyze the information to determine the appropriate actions to take with respect to the information. For example, if the submission is sent, such as in the form of an HTTP request, with a command related to content selection, the submission evaluator may parse the submission to determine the command and to isolate the content submitted with the command. The content may be, for example, HTML code that has been selected by a user, and that content may be extracted from the other information submitted by terminal 122. In another example, the submission may include a request to edit a notebook, such as to add a heading in a notebook, or to edit content within a notebook, such as to add comments within content that previously has been clipped from a web page.

Notebook compiler 124a can manage a user's notebooks, and can add, edit, or delete content in notebooks. For example, where submission evaluator 124b has determined that a message (such as an HTTP request from the computer of a notebook author or other user) relates to content selected from a web page, it may pass the content to the notebook compiler 124a along with metadata that has been parsed from the request. The metadata may be used, for example, to determine the identity of the user, and to determine the user notebooks to which the content should be added. The notebook compiler 124a may then obtain the current version of the notebook from notebook database 118, and may append the new content to the notebook. The notebook compiler 124a may also update a database of metadata relating to the notebook (which may be stored, for example, in user information 132) and may save the updated notebook to database 118.

Notebook analyzer 134 may access notebooks in database 118 to provide users or administrators of the system 100 with information relating to the notebooks. Notebook analyzer 134 may be programmed with various processes and other features to obtain notebook information, analyze it, and generate reports regarding the information. For example, notebook analyzer 134 may be used by search engine 128 to build an index of content in database 118 to permit for more efficient searching of database 118. As another example, notebook analyzer 134 may identify links between different notebooks or between notebooks and web pages, and may permit mapping of relationships in the analyzed notebooks, or web pages.

Through these components, notebook manager 120 can create new notebooks, edit existing notebooks, combine information from various notebooks, allow users to see notebooks created by other users, allow users to search across multiple notebooks, permit a system to analyze notebooks such as to provide searching of notebooks, more efficient searching of web content, and easier navigation of notebooks, and to permit reports to be generated regarding notebooks and notebook data. In certain implementations, fewer than all such functions may be performed by a notebook manager 120.

Figure 2:
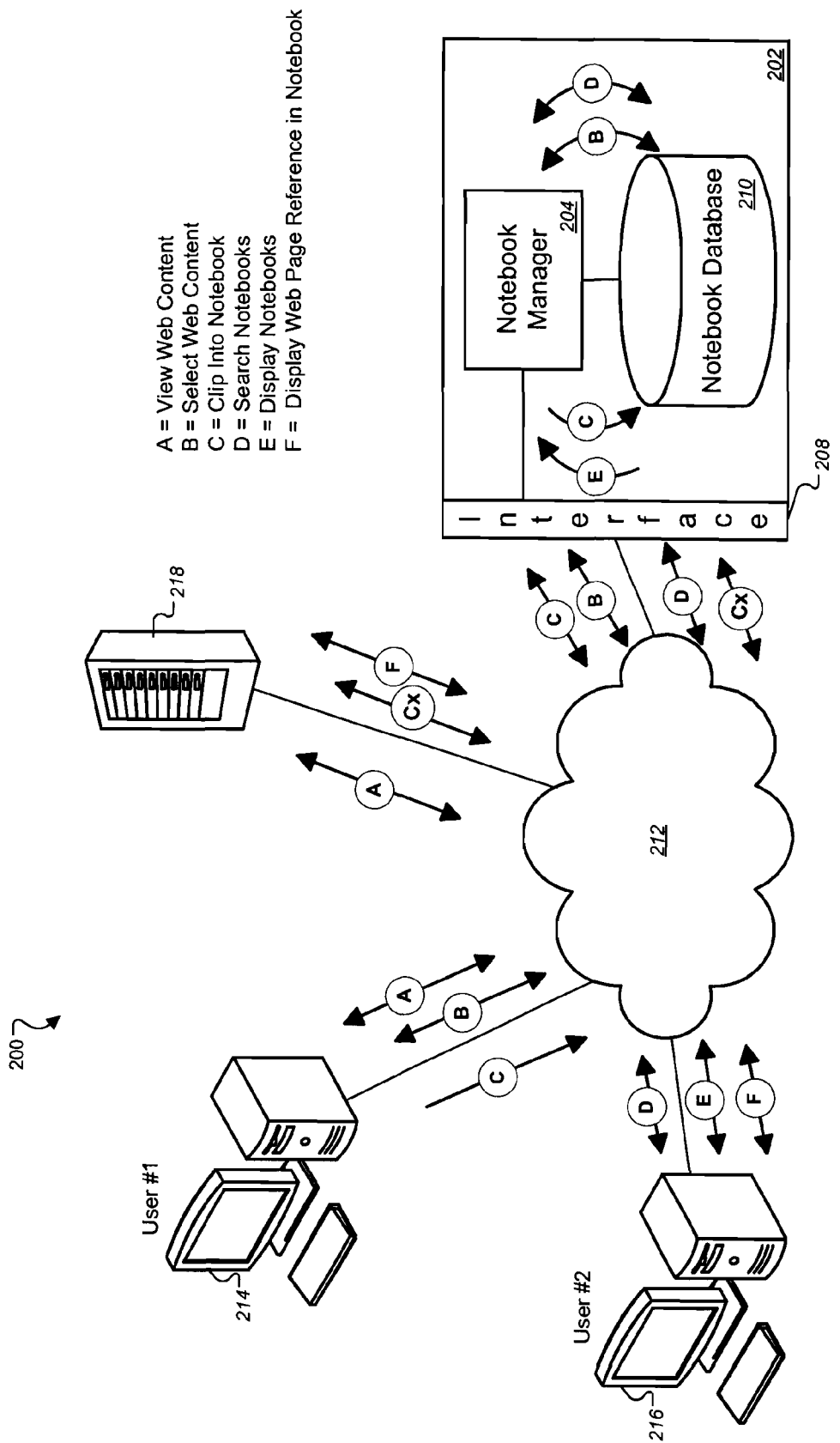
FIG. 2 is a schematic diagram showing an exemplary flow of information between components in a web notebook system.

FIG. 2 is a schematic diagram showing an exemplary flow of information between components in a web notebook system 200. The system 200 includes various computing devices or computing systems to communicate through a network 212 such as the Internet. Information service provider 202 stores information relating to notebooks in notebook database 210, which may be accessed by notebook manager 204. Notebook manager 204 may in certain implementations be the same as or similar to notebook manager 120 shown in FIG. 1. Notebook manager 204 communicates with other components in the system 200 through interface 208, which may be, for example, one or more web servers and other related components.

Rack server 218 represents a provider of web page content, such as a corporation presenting its web page, a commercial content provider, or other web content provider. Various forms of content may be provided, though one common form of content is web pages using variants of markup languages such as HTML.

Terminals for two users are also shown. Terminal 214 represents a computer that may be used by a person who creates a public web notebook by compiling information from various web pages. Terminal 216 represents a computer that may be used by a person looking for information about web notebooks.

Lettered arrows in the figure represent flows of information in an exemplary process for creating and reviewing notebook content. The process may begin with the arrows labeled A. Terminal 214 may be, at that time, used to browse the web. For example, a user of terminal 214 may be interested in New Zealand and the sights of New Zealand. That user may have just returned from a vacation in New Zealand and may wish to create a notebook summarizing what they saw while on vacation. At arrow A, the person obtains content from a web page stored on rack server 218, such as by entering a URL for a restaurant in Auckland. The rack server 218 may respond by providing a web page associated with the restaurant.

The arrows labeled B represent communications that occur when the user begins selecting information from the web page. For example, a user may highlight content from a web page by clicking and dragging across the content. This action may cause the beginning of a process to analyze the selected content, which may result in the system 200 providing the user with a name of a notebook from among the user's notebooks into which the content should be placed. For example, if the web page the user is reviewing has a heading of "New Zealand," and one of the user's notebooks has a similar heading, the notebook manager 204 may infer that the user intends to clip the information to the New Zealand notebook, and may present an icon representing that notebook as a default selection for the selected content. Alternatively, terminal 214 itself may make such an inference, or may simply place the selected content into whatever notebook is currently active on terminal 214. In such alternative situations, the communication shown by label B with the information service provider 202 would not be needed. Information other than a heading or title can be used in the analysis process, such as, for example, user-supplied annotations, images, metadata, or any other content in a user's notebook(s).

The arrows labeled C represent the addition of content to a notebook. For example, if a user chooses a notebook selected by notebook manager 204, the selected content may be saved to that notebook by notebook manager 204 in notebook database 210. Alternatively, selected content may be saved initially by an application operating on terminal 214, and may be transferred to notebook database 210 when such an action is chosen by a user, such as when a user chooses to save actions at the end of a browsing session. Alternatively, terminal 214 may send to the manager 204 information about a pointer to the content to be added, and manager 204 may obtain the information directly from rack server 218.

Where the content is on a web page that is regularly updated, the notebook manager may request the content later from rack server 218, such as shown by the arrows labeled Cx. In that situation, a link or pointer may initially be stored in the notebook, and the request for up-to-date content may be made by notebook manager 204 at an appropriate time, such as periodically or when a user requests to view the notebook.

The arrows labeled D represent a request for information by the user of terminal 216. The user may be interested in web notebook content or other web content, and may be conducting ordinary browsing and searching. The request may be, for example, a search request directed to notebooks in notebook database 210, or a more general search request covering content from the world wide web (WWW) and content in notebook database 210. The search request may take a normal form, whereby a user enters search terms and submits them by way of HTTP request to a search engine (not shown). The user in response may be provided a list of search results in the form of hyperlinks to matching content and additional information.

The arrows labeled E represent a selection by the user of terminal 216 of a web notebook from a search result. Such a selection, (e.g., a selection of a hyperlink directed to the notebook), causes information service provider 202 to return an HTML document that represents the notebook. Terminal 216 then displays the document to the user. The notebook document may include content taken from various web pages by the user or by other users, and may also include hyperlinks to the web pages from which the content was taken.

The arrows labeled F represent selection by a user of terminal 216 of a hyperlink for content to a web notebook. As depicted, the hyperlink is directed to the original web page stored at rack server 218, which returns an HTML document to terminal 216 of that original web page. Alternatively, the web page could be cached at information service provider 202 and provided from there. The user may then navigate back to the notebook, select content from the web page or from the notebook to add to the user's own notebook, or perform other appropriate functions.

In this manner, the system 200 provides a user of terminal 214 the opportunity to create and provide web notebooks that contain original content and also content compiled from other web pages. The web notebooks may be provided by system 200 as markup (e.g., HTML) documents that contain the total of the markup code that has been clipped from various sources in addition to content (e.g., headings and titles) added directly to the notebook. Alternatively, the notebooks may be built on-the-fly, in whole or in part, when a request is made for them, such as by storing a notebook as a number of pointers, and following the pointers to obtain content before serving the notebook in response to a request. The system 200 also enables users, such as a user of terminal 216, to search for and review such web notebooks, and thereby obtain information that is more relevant or more appropriately formatted than information scattered across multiple different web pages.

Figure 3:
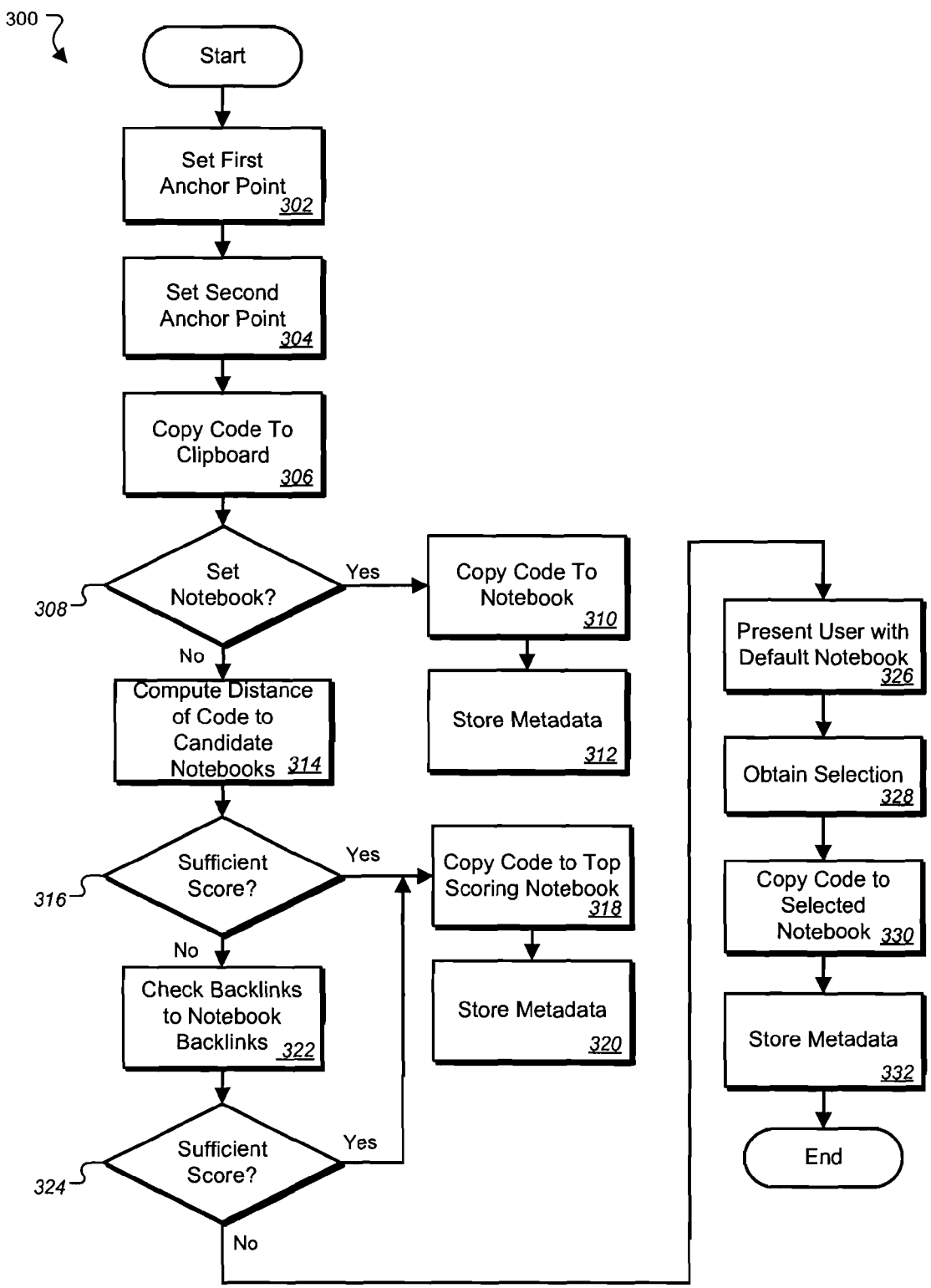
FIG. 3 is a flowchart showing actions that may be taken to capture information for a web notebook.

FIG. 3 is a flowchart showing actions that may be taken to capture information for a web notebook. The operations 300 can be performed by a user who is employing a notebook development application to select content for inclusion in one or more new or previously existing web notebooks. For example, the user may visit several websites that contain information related to a particular topic of interest and clip portions of the information for the web notebooks.

Alternatively, the operations 300 can be performed automatically by the notebook development application based on user-entered topic requirements. As one example, the notebook development application may automatically find and highlight excerpts in web pages that pertain to a particular topic. For example, a user may wish to add more information to a previously created web notebook that details the topic of, e.g., ice cream. If a user chooses to allow an automatic search, the notebook development application can automatically attempt matching the ice cream topic to snippets of information in web documents that the user may wish to add, such as an address of a Baskin Robbins near the user, or a recipe for homemade ice cream—much like an "I'm Feeling Lucky" option for notebook generation.

The operations 300 begin in step 302 when the user sets a first anchor point by placing a pointer onto a web page document. Setting an anchor point begins the selection process to capture any resource available in a document, such as an HTML page, an image, a sound file, a movie, or a text selection, to name a few examples. The first anchor point may be set, for example, upon a depress signal (left button down) from a mouse or by other appropriate mechanism.

Next, the user sets a second anchor point, in step 304, to highlight a selection of data. For example, the user may place a pointer on an image, set the first anchor point, drag to the end of the desired image, and then set the second anchor point to capture the image, (e.g., highlight a selection of data). The setting of the second point may occur, for example, by a release of a mouse button, or by the user hovering over one point for a sufficient period of time after selecting the first anchor point. Where the second point is determined by such hovering, the determination may be reset if the user subsequently moves again before releasing the mouse button or other input mechanism.

A web notebook application operating on the user's computer may permit the user to fully capture data content simply by highlighting it, without having to find and click on a separate menu or enter multiple keystrokes to complete the selection operation. Upon receiving a first and second anchor point, the application may automatically display an icon beside or near the cursor or second anchor point. The user can then click on the icon to complete the selection operation.

The web notebook application may be part of a browser extension or plug-in that operates with the browser installed on the user's computer. The application may also be configured to communicate with a remote server, such as to send messages to the remote server for storing and managing web notebooks. The messages may take the form, for example, of HTTP requests, and may include messages that send selected content to the remote server, and also send metadata relating to the content to the remote server.

Displaying a notebook-related icon near to where the pointer or cursor is located when the highlighting operation is completed (e.g., upon release of a button on a pointing device such as a mouse, or after the pointer or cursor has hovered over one location for a sufficient time period), and inside the content area of the browser, can make the selection easy to accomplish for the user. The user can click the icon to copy, or clip an image for the notebook, rather than having to move the cursor to a menu—such as a menu near the edge of a page. In addition, by making the icon specific to a notebook clipping action—e.g., where only a single option is shown by the icon—a user may more readily select the icon without having to navigate through multiple choices.

Alternatively, an automatically displayed icon can present options to the user for keeping, discarding, modifying or adding to the new snippet of information, and the like. For example, a user may wish to see all results with recipes for Kung Pao chicken, and quickly scroll through to determine which recipes to clip and keep and which recipes to discard, simply by highlighting and clicking. The highlighted recipes can be clipped without requiring extensive user interaction, such as finding a menu, or opening another outside application for storing results.

Each selection from a web page can be made up of code that creates the images, sounds, or text present on the page, such as markup text (e.g., HTML code and the like). When a user highlights and selects an entry using the web notebook tool, the code can be the actual entity captured and recreated on a clipboard. As shown in step 306, the user can choose to copy the selection to the clipboard—which may be an operating system clipboard or a clipboard specific to the notebook application. The clipboard may contain several entries (or selections) of various media types and can make the entries available for transfer into a particular web notebook. Where the web page contains a reference to other content, the reference may be copied to the clipboard or the actual content may be clipped.

If the notebook to which content is to be clipped is set (e.g., identified) in advance (step 308), the content may be copied to that set notebook (step 310), and metadata related to the clipping may be stored (step 312). A notebook is "set" where the application may know in advance the notebook in which clipped content will be placed, such as when a notebook has been selected or opened by a user in advance. For example, HTML code copied from a target web page may simply be appended to the end of the set notebook—perhaps with a particular heading for the entry provided by the user. For metadata, the URL for the web page may be stored so that later viewers of the notebook may navigate easily back to the web page.

Likewise, other metadata may be determined and stored, as discussed above. For example, capturing metadata can include acquiring data from the web page containing the selection, such as HTML tags, keywords, access limitations, time and date stamps, backlinks, user data, search criterion, and the like. As one example, metadata can include a designation that a particular web notebook is now to be shared with other users. Metadata can also be shared across notebooks as a way to link notebook content together. For example, linking content in the notebook can link a first notebook to a second notebook and increase the likelihood of finding content related to both notebooks when searching.

Metadata can be written to the notebook along with a standard entry, or may be written as hidden text only visible when a user selects an option to show hidden text. Alternatively, the user can configure a separate file or entry for all metadata captured in the notebook. Metadata can be captured and saved for a user-specified amount of time. For example, after thirty days, a user may choose to flush the notebook of irrelevant metadata, such as metadata that was collected on a default notebook where a user placed data that did not belong to other existing notebooks.

Where there is no presently set notebook, the application may determine the notebook into which the content should be placed, e.g. by analyzing content of existing notebooks. For example, a user may have clipped a selection regarding the life of supermodel Gisele Bundchen, and determine to place the selected text into the Patent Attorney Supermodels notebook 116d based on the related topic of "supermodel" in the notebook. Alternatively, the user may choose to manually place the selected text into a selected or new web notebook. For example, the user may choose to create a new notebook for the Gisele Bundchen selection. The application may refer to an external database, such as a database on a remote server, to obtain information relating the selected information to other topics, such as the topics in the user's available notebooks.

Automatic analysis of selections and web notebooks can be completed in any number of methods. Each method can perform a computation for determining a similarity between the selected text and content of the various notebooks present on a user's computer system (step 314). A first determination of a content set can be made from a web page and a second determination of individual content sets can be made from each of the notebooks. For example, the content set can include the entire webpage, or important details of the web page, including HTML tags, such as the title and heading tags, or it may include the actual selection of text. The content set may also include particular topics or keywords in the web page to determine where to place a selection. In addition, specific topics or keywords may be given a weighting to make placement decisions easier. Content of notebooks that are analyzed can include clipped content; snippets or snippet portions; notebook titles; user-supplied headings, annotations or free-form text entries; metadata; etc.

For example, a set of vectors may be computed using the link structure of the web to capture the relative importance of a selection with respect to a particular topic. A higher weighting can be given to keywords that have a strong relation to the selected topic. For example, the web notebook application may assign a higher weighting to the notebook title or a title of headings within the notebook. In addition, a higher weighting may be given to more current notebook entries in each notebook. Also, the system could allow a user to assign keywords to each notebook as metadata, and those keywords would be used, either exclusively or predominantly, for comparison purposes. Keywords may also be used in a search engine aimed at using the web notebooks. For example, the search engine can include a module that searches for existing web notebooks on a user's computer system and limit returned search results to those topics.

In step 314, the web notebook application can perform a computation on the distance (according to weighting) of the selected text code to that of the candidate notebooks selected for possible relevancy. For each relevant selection, in some implementations, the score is calculated and weighted, and in step 316, the web notebook application can determine whether or not the score is sufficient.

If the score is sufficient, then the code can be copied to the top of the scoring notebook, in step 318. When the code is copied to a particular scoring notebook, metadata can be stored in step 320, for future use when determining appropriate notebook topics. However, if the web notebook application determines the score is insufficient, a process to compare backlinks in the selected web page to backlinks in the notebook can be performed, in step 322.

If relevant backlink topics exist, the weighting for the matching web page can be raised. Otherwise, the weighting for an irrelevant backlink topic can be lowered, thereby lowering the overall score of the web page. The scoring can be calculated, in step 324, for each relevant backlink. If the score is sufficient, the web notebook application can copy the code to the top scoring notebook and compute and write metadata for future use.

Upon completing the analysis of web notebooks and selections, the web notebook application can iteratively determining whether a particular notebook should be set as a default notebook for new content, based on the analysis results. Each method can use weightings to determine a scoring for a particular keyword or topic according to the existing web notebooks. If a weighting of the selected text has high enough relevancy to a particular notebook, that notebook may be set and the selected text can be copied to the notebook, in step 318.

The code may be copied to the web notebook automatically or by the user selecting the icon to copy, such as if the system presents a suggested notebook to the user. Alternatively, the user can select the content and drag it to the notebook (such as by dragging to a title of a notebook in a list of notebooks) with a cursor. The content can be copied into the notebook and may appear exactly as it does on the web page, or modifications can be made to the text or markup code and only partial snippets of the code may be copied. For example, a user may only wish to copy the Universal Resource Locator (URL), but not the title or other content related to the web page.

The web notebook application may determine that a notebook related to selected content does not exist in the user's computer system, and may therefore present the user with a default notebook, in step 326. In some cases, the user may not wish to place the content in the default notebook, and can reject the option to do so. Other options can also be provided. For example, the user may be presented with a screen that inquires if the user wishes to copy the entry as-is to the notebook, compose a heading for a particular entry before adding it to the web notebook, or simply delete the entry altogether. The user may bypass any or all of the options above.

Alternatively, the user may be presented with a list of all notebooks to which the user has editing privileges, or all notebooks determined by the system to have some level of relevance to the selected content and let the user select the notebook into which the selected content Is to be placed. The listing of web notebooks can be presented to the user in an order according to a hierarchy related to ranking scores, user access statistics, and/or alphabetically, to name a few examples.

In some situations, the user may wish to place an unrelated item (e.g., an item whose content is not related to other content already in the notebook) in a particular notebook because the item might be relevant at a later date. As an example, when putting together a list of textbooks to purchase, the titles may not relate to one another, but the user's object may be to create a list of necessary books in one place. The user may obtain the selection, in step 328, after selecting the desired content and selecting a notebook. Next, in step 330, the code (selection) can be copied to the selected notebook. The copying process can append the selection to the end of the notebook by default, or provide the user with other options for storing the selection. In addition, the user may be provided with options to append the selection to several notebooks at once. When the code is copied to a particular notebook, metadata can be stored to the notebook in step 332, for future use when determining appropriate notebook topics.

Figure 4A:
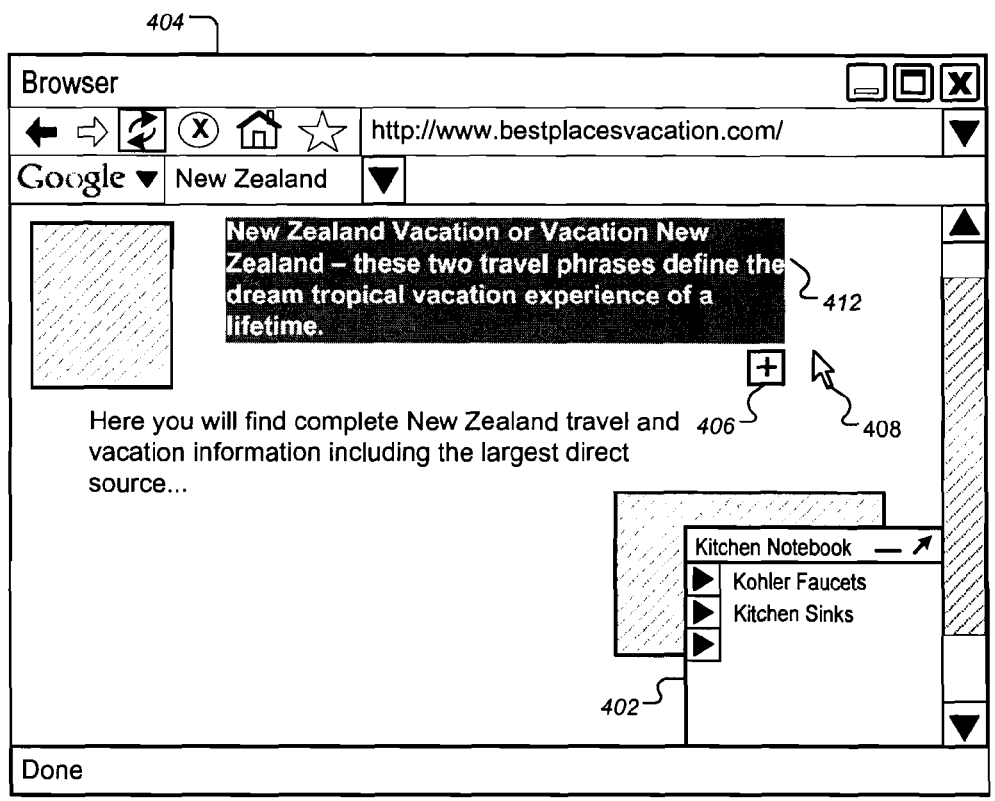
FIGS. 4A-4B are simplified screen shots showing a mechanism for selecting content for inclusion in a web notebook.
Figure 4B:
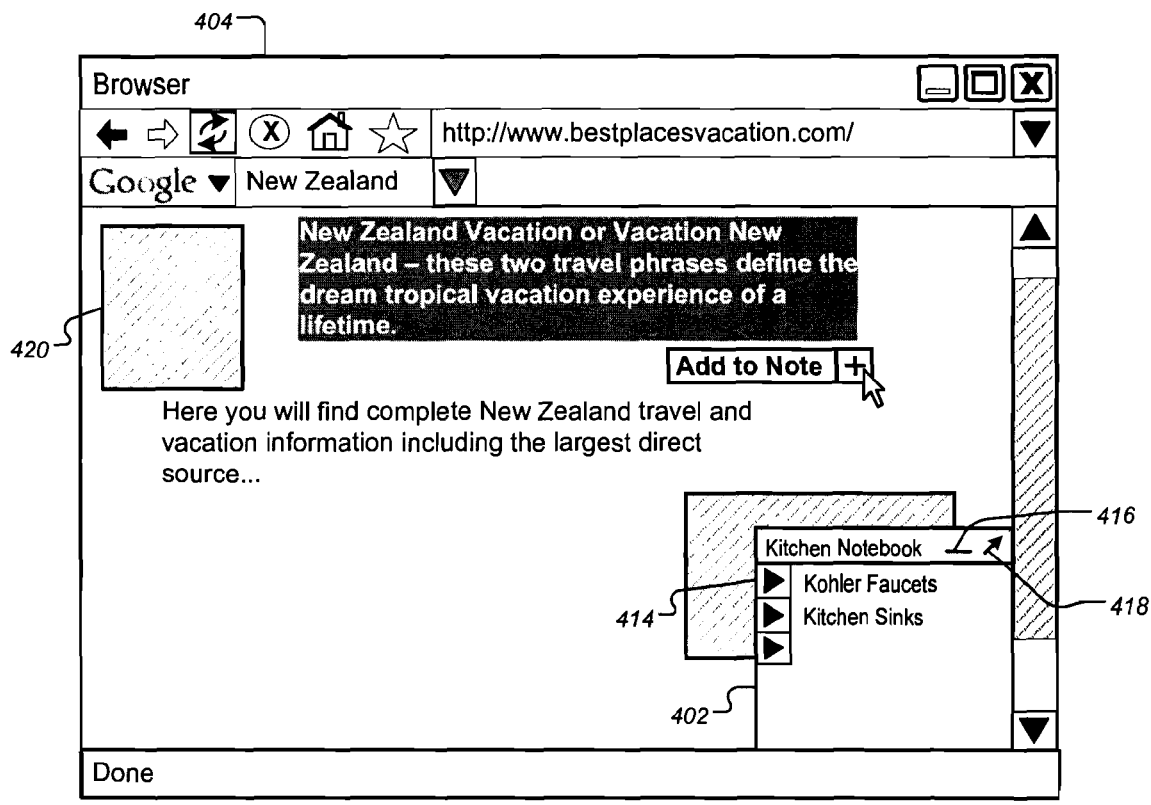

FIGS. 4A-4B are simplified screen shots showing a mechanism for selecting content for inclusion in a web notebook. Web notebooks can be displayed in a surf-along window 402. The content can be displayed in browser 404 on a user's computer system. The user can then review and clip various content and save it in a particular web notebook displayed in the surf-along window 402. Web notebooks can capture and contain various different media content including images, sounds, metadata, and a link (e.g., a URL) back to the originating document. Captured content can be added and displayed in the surf-along window 402 as it is selected and clipped.

The web notebook surf-along window 402 can be implemented as a plug-in. For example, services provided by the plug-in can include access control, client monitoring, or file system access. In general, plug-ins may require that particular code be installed to operate, which, when installed, can then be used to extend or customize computer system functionality. For example, the functionality of browser 404 may be extended by a web notebook plug-in that provides the surf-along window 402 and other notebook functionality. The browser 404 can provide a way for the web notebook plug-in to register with the browser, and to determine a protocol by which data is exchanged. The application may be generated and operated, for example, using AJAX techniques.

The example shown in FIGS. 4A and 4B depicts the embedded control 406 ("+" symbol). Other convenient representations may also be used. In normal operation, the application for the embedded control can run in the background, monitoring the user's actions but not always being visible. Commands can be provided to the user, however, to display or hide a portion of the application or to activate or inactive the application.

The embedded control 406 may appear in the browser window after a user has made a selection on the web page. The embedded control 406 can appear adjacent to the point of selection, thereby allowing easy user selection of the control 406. In some implementations, the embedded control 406 may be distinguished from the web page background by appearing in bold, semi-transparent, blinking, as a button that stands out from the background, or shown as a visually changing icon, to name a few examples.

In certain implementations, the embedded control 406 can also be placed centered over the selected text. Alternatively or in addition, a watermark could be placed over all selected content and the embedded control icon 406 could be placed on a watermark or shaded area over the selection, or near the edge of the watermark. For example, the watermark can appear similar to a standard text selection, but could be drawn like a transparent semi-transparent box that envelops the selected content.

The web notebook application can also include sub-controls that may appear when the user selects or hovers the pointer over the embedded control 406, or interacts with the control in some other manner. As shown in FIG. 4B, the user can hover over the embedded control 406 using pointer 408 to trigger an "add to note" sub-control 410 to appear next to the original "+" embedded control 406. The user may then select the "add to note" control 410 to add the selection to a web notebook. In some implementations, the web notebook application may not require selection of the "add to note" embedded control 410. For example, the user could highlight a text selection 412 and simply click the "+" control 406 to add the highlighted selection to the user's notebook.

Alternatively, the web notebook application could display a list of options to the user. For example, the list may contain options for organizing the selection's contents, adding a note before pasting to the notebook, emailing a selection to another user, or an option to merge the contents with a previously pasted note. In addition, the application may work as an adjunct to commands that would normally be available in a browser by right-clicking after making a selection. Clipping material to a web notebook may be provided along with such a right-click or other menu, though such an approach could cause the application to lose some of the functionality described above.

Other options may be readily provided to a user before content is clipped into a notebook. For example, a user may be given the option of turning selected text into a sound file, adding an annotation either to the content or as metadata to be stored with the notebook entry, adding a heading for the entry, modifying an image from the content (including in-browser modification), making a purchase related to the content or making a connection to an organization offering such content for sale (e.g., to form a referral relationship for products gathered together in a notebook). For the last example, in one application, a user could form a web notebook that contains summary paragraphs of reviews of audio and video equipment in certain categories (e.g., projection televisions, 6.1 amplifiers, front-projection televisions, LCD televisions, and plasma televisions) so that user may browse the reviews and may select controls in the notebook to be taken to the original reviews to receive more detailed information. The notebook may also direct users to certain retailers so that the users may easily buy the products and the notebook author may (e.g., assuming a public notebook) receive a referral fee in exchange for gather important information for users.

In addition to the controls and sub-controls that appear outside of the surf-along window 402, there can be internal controls that can perform operations on notebooks available in the computer system. The internal controls can be located within or on the surf-along window 402. Arrow 414 is one example of an internal control that can expand or contract a notebook entry when selected by the user. For example, when a user selects arrow control 414, the "Kohler Faucets" heading may expand to show several styles of Kohler faucets, such as sink faucet handles—each of which was selected by the user as an entry in the notebook. Alternatively, the arrow control 414 may be selected to expand the heading to also show the text and other content in a particular notebook entry. In this manner, a user of the application can readily review material that has already been added to a notebook, but then hide the detailed recitation of the material to permit better viewing within the relatively small surf-along window.

The arrow control 414 can also be selected to drag notebook items within the list to reorganize selections. For example, the Kohler Faucets arrow control 414 or the corresponding heading could be selected and dragged below the Kitchen Sinks heading so as to reorder the content in the Kitchen Notebook. Alternatively, the Kitchen Sinks control or heading may be dragged upward. In addition, the arrow control 414 can be used to drag items between notebooks. Several arrows can be selected at once for the purpose of transferring several items between notebooks, as will be explained more fully below.

In some implementations, a control for adding content to a notebook can be included in the surf-along window 402. For example, a control, such as the control 406, can be included in the surf-along window 402 and can be activated to cause selected content (e.g., selected content 412) to be copied to an active notebook that is displayed in the surf-along window 402. In some implementations, if no content is currently selected, activation of such a control can cause a portion of the browser window 404 to be added to the active notebook (e.g., an automatically generated summary of viewable text, a visible image, a portion of visible text, etc.). Metadata can also be added to the notebook and can include, for example, information about a corresponding search query or about the current web domain, page or portion of a page (e.g., www.bestplacesvacation.com→New Zealand), etc.). Metadata can also include information identifying a current user, information about a current or default notebook, settings for notebooks (e.g., whether the notebooks are to be public or private), time or date stamps, etc.

Control 416 may be selected to minimize the surf-along window 402, while control 418 may be selected to enlarge the window, such as to display an entire notebook, as will be discussed with respect to FIG. 6.

As shown in FIG. 4B, the shaded box 420 is a representation of an image that may be selected and captured by the user; however, in this example, image 420 has not been selected. In some implementations, certain content such as images may be recast in the surf-along window as smaller images or as icons and the like to make the display easier to view in a smaller space. Large items may also be removed from notes when they are displayed in the surf-along window.

Figure 5A:
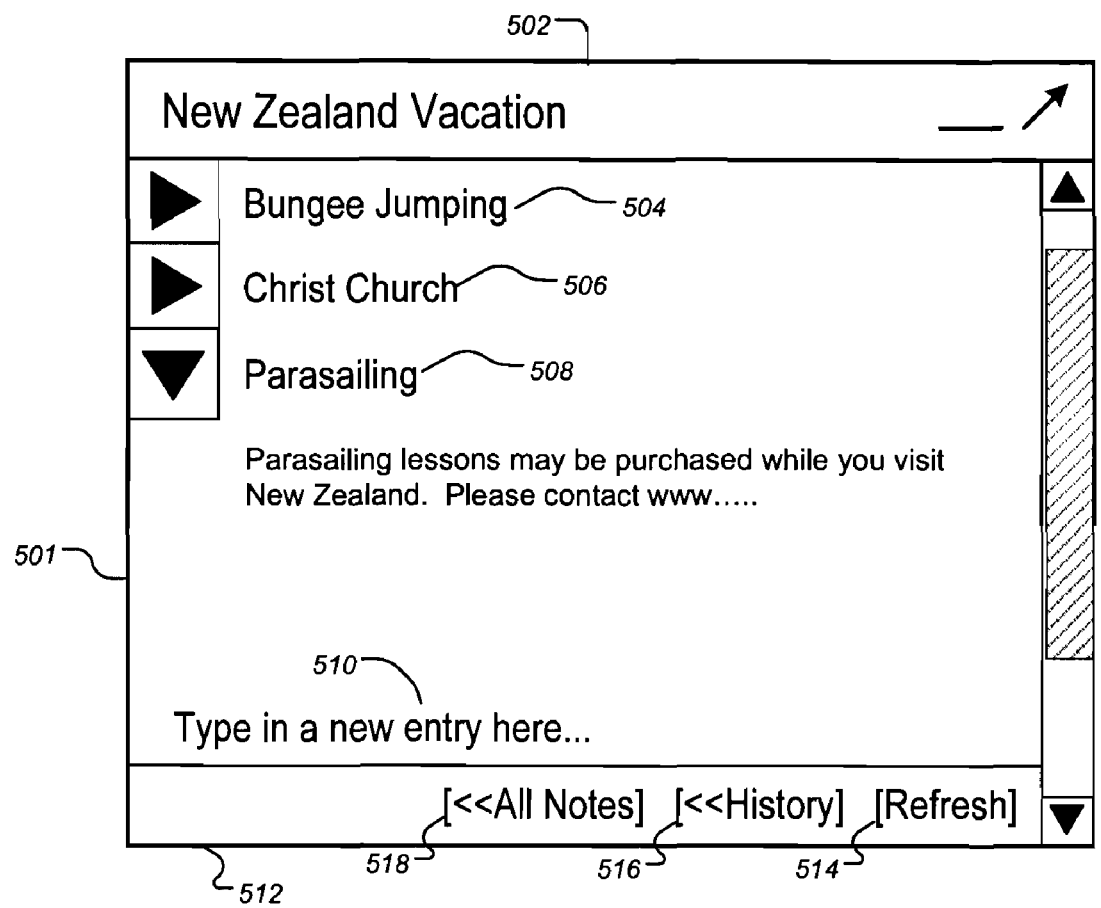
Figure 5C:
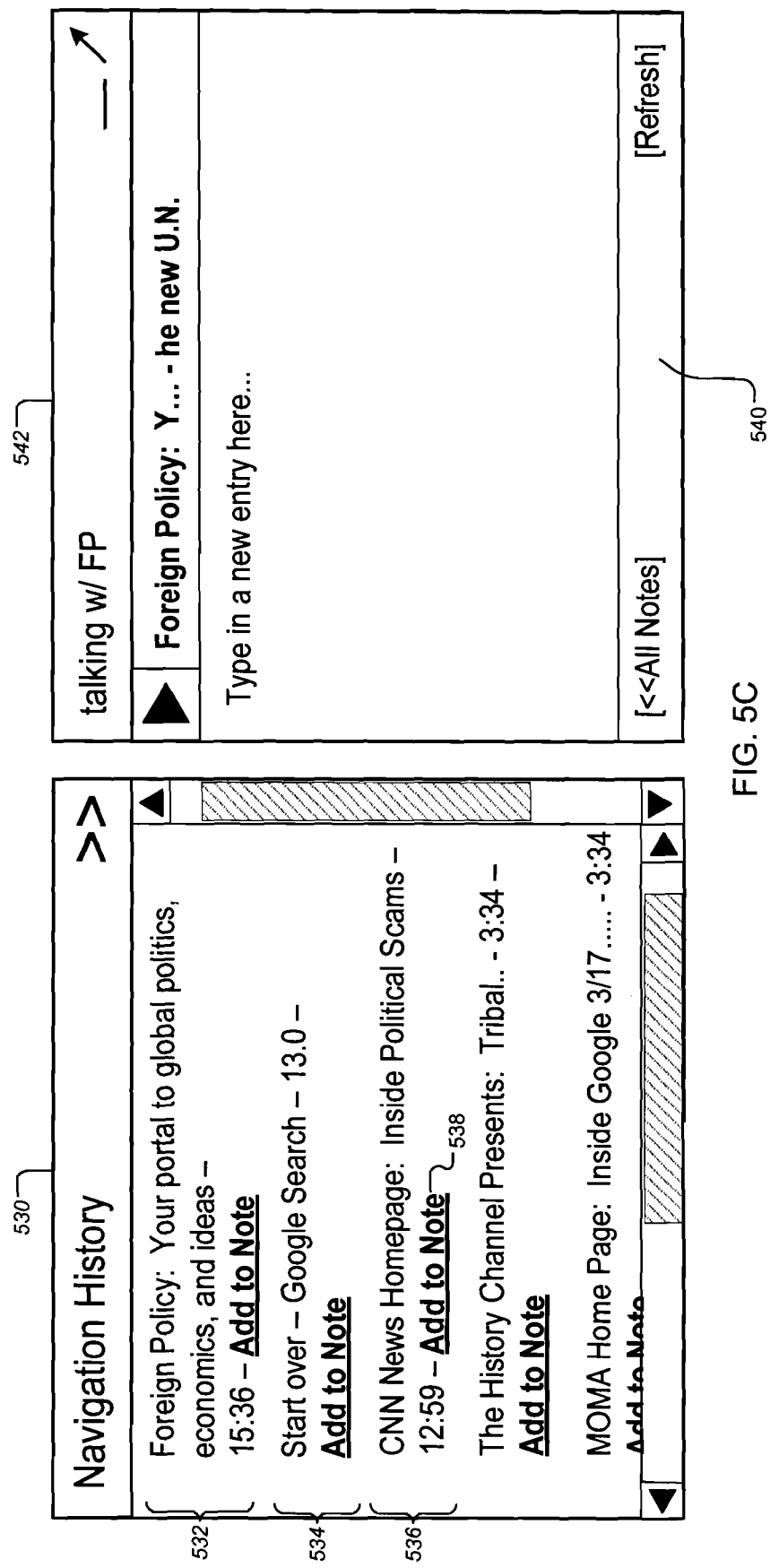

FIGS. 5A-5C show different forms of surf-along windows for displaying captured web notebook content. Referring to FIG. 5A, the notebook headings and some of the notebook content can be displayed in the surf-along window 501. In this example, the notebook content has been previously clipped from information stored on various web pages relating to New Zealand, such as by a user who has recently visited New Zealand.

In particular, web notebook 502 includes a "bungee jumping" entry 504, a "Christchurch" entry 506, and a "parasailing" entry 508 captured from one or more websites about New Zealand vacations. As shown, the parasailing entry 508 has been expanded to show content that was previously captured. The user may have found a web site on New Zealand parasailing lessons and clipped the details for later use. In addition, the user has employed the labeling functionality of the web notebook by applying a title of "Parasailing" for the entry. The title may have been entered by the user from scratch, or the system may have suggested the title, such as by applying the title of the source web page, and giving the user an opportunity to use that title or select a different title. In one implementation, as shown, the user can add to the list of entries by inputting a new note using an add entry tool 510. The add entry tool is shown in FIG. 5A with the caption "Type in a new entry here."

The surf-along window 502 includes a toolbar 512 where a user can choose display options. The toolbar can include a refresh tool 514, a history tool 516, and an all notes tool 518. For simplicity, three display tools are shown in FIG. 5A; however, any appropriate number of display tools can be used with surf-along window 502.

The user can refresh the view by selecting a refresh display tool 514. The refresh display tool 514 can update the current surf-along window with new data entered by the user. For example, the user may add a new entry by typing in text and selecting the refresh tool 514. Upon selecting the refresh tool 514, the new entry can be added to the current list of notebook entries. Alternatively, the refresh tool 514 can search the entries and update a page in the notebook if a particular web page has recently moved. In some implementations, selecting the refresh tool may collapse all entries in the currently selected web notebook. In some implementations, the user's local computer may store much of the information for operating the notebook application, and the refresh tool may cause locally-stored information to be sent to a remote server, and information from the remote server to be used to update the local computer.

The history tool 516 can display the navigation history for a particular user. The directional arrows ("<<") in the menu selection indicate that selecting "history" will cause another window to be displayed to the left of window 502. For example, when the user selects the history tool 516, all recently visited web pages and user interaction can be displayed. In some implementations, the user can be shown history from the most current web notebook session. Alternatively, the user may view all navigation history over a particular time period. An example of the history display will be described in reference to FIG. 5C.

As shown more fully in FIG. 5B, the "All Notes" tool 518 can display all user-entered notes. When the user selects the "All Notes" tool 518, a selection window 520 can be accessed to display all notes pertaining to entries for one or more of the notebooks present on the user's computer system. Information for the "All Notes" window may be stored locally on the user's computer (even if the users' notebook is otherwise part of a hosted system), or may be produced by making a request of a remote server storing the notebook information.

The selection window 520 is meant to show a list of notes or notebooks for the user. The user can select or highlight a note in the selection window 520 and the web notebook application can display the corresponding content in another surf-along window 522. For example, the selection window 520 shows notes on several topics 524, including new digital cameras. As depicted, the user has, for example, selected "All Notes" while working on his or her New Zealand Vacation note (shown in FIG. 5A), and then selected the "new digital cameras" note from the list of all notes. As a result, entries about various digital cameras are displayed in the surf-along window 522.

In one example, the user may have been surfing for specific camera model numbers and may have made notes about where the results were found (e.g., Froogle.com). While surfing, the user can add new notes using the "create a new note" tool 528. New notes can be linked to existing notes by creating the note and placing it under a particular note heading. For example, a new camera model can be added under the "new digital cameras" note simply by creating the note and dragging the note such that it nests under the "new digital cameras" heading.

Directional arrows in the upper right corner of window 520 can allow the window 520 to be collapsed back into window 522 when the user is finished looking for other notes or notebooks. Alternatively, the various notes may be provided as labeled tabs across the top of window 522 in a conventional manner. Other functionality may also be provided in expanding and collapsing windows like those shown in FIGS. 5A-5C.

FIG. 5C shows an example of what can be displayed with the history tool 516. For example, when the user selects the history tool 516, a selection window 530 can be launched showing navigation history. Navigation history can include all recently visited web pages and user interactions. For example, the window 530 shows that the user viewed a web page on foreign policy 532, then initiated a new Google search page 534 and then surfed to the CNN News Homepage 536, and so on. In this example, each item also includes a timestamp for when the particular item was visited or accessed.

The navigation history can also include other user interactions, such as opening a file, or creating a note (not show). During a history view session, the user may inspect the navigation history and add notes to notebooks from the history window. For example, a user may wish to create a notebook from the search results that occurred in the previous twenty-four hour period. The history tool 516 may allow a user to quickly review recent browsing history and add content from the recently browsing history to a notebook simply by selecting an "Add to Note" link 538 that appears for each entry in the navigation history.

In addition, users may be able to revisit web pages in the navigational history to determine whether they would like to add them to a notebook. In this way, if a user decides that he or she would like to add previously viewed content, the user can more easily return to it. In addition, the application may store with each entry in the history, an indication of the notebook that was active when the user visited the web page of other web document. In this manner, if a user chooses to add content from the page later by using the history listing, the system can identify a candidate notebook in which to place the new entry.

In some implementations, the included toolbars may change each time a new tool is used. For example, when the "All Notes" tool is selected, the "All Notes" caption may be deleted from the toolbar, as shown, until another tool is selected. The removal of the tool from the toolbar ensures the user can quickly identify which tool is being utilized. To activate another tool, the user can select that tool from the toolbar 540 in window 542.

Figure 6:
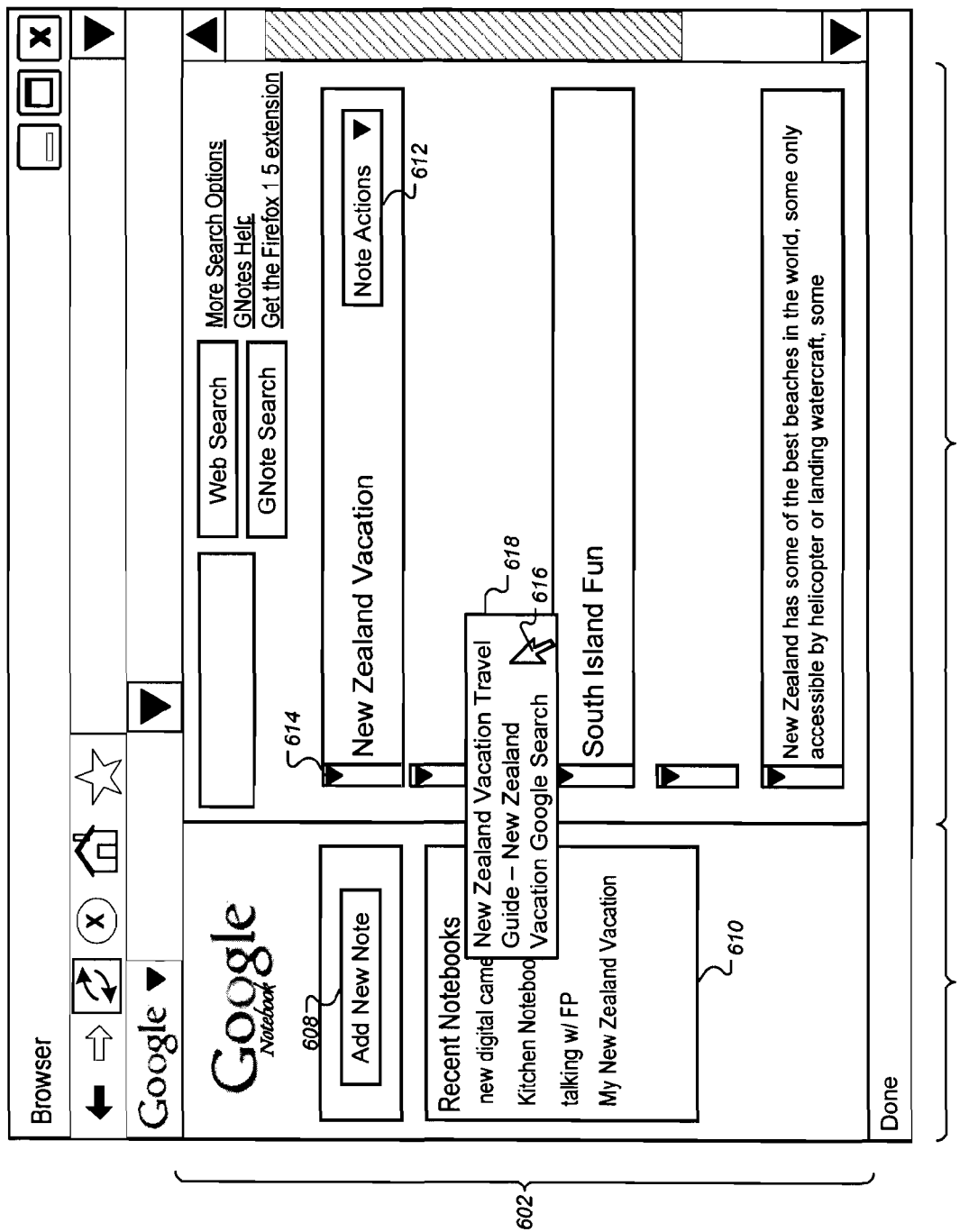
FIG. 6 is a simplified screen shot of a web notebook manager display.

FIG. 6 is a simplified screen shot of an example web notebook manager display. The web notebook manager 602 can be used to manage and organize web notebooks on a user's computer system. The manager 602 is shown in its on browser window, and can be used to organize, edit, create, merge and delete web notebooks. Alternatively, the manager 602 can be used to perform new searches. In general, the manager 602 provides information similar to that in a surf-along window, but with more detail and functionality, as facilitated by the more complete display permitted with the manager 602.

As shown in one example, the web notebook manager 602 includes a sidebar window 604 and a main window 606. The sidebar window 604 can include an area 608 to add a new note to a particular web notebook, and a section for recently accessed notebooks 610. As shown in FIG. 6, several recent notes exist for this particular user. The label for a particular note may be selected by a user to make that note active in the main window 606, or the Add New Note button may be selected to place an empty note in the main window 606. A control above the sidebar window 604 is also displayed to provide a drop down menu for access to various features provided by Google.

In certain implementations, each user may have a separate web notebook manager. For example, each web notebook manager may have a login screen to determine which user results to display and begin organizing. The recently accessed notebooks 610 can be listed ordered by date of creation or access, ordered by category, title, or simply alphabetically ordered, to name a few examples. In addition, a user can select each note individually and relocate it elsewhere in the list 610, or alternatively can move the note out of the list altogether. For example, the user can select a recent note and send it to a trash can for deletion. Such movement of notes may be accomplished in a drag-and-drop fashion. In FIG. 6, an entry about New Zealand is shown being dragged from the main window to one of the Recent Notes. When dropped, it can be added to the end of the particular note, and its metadata can be transferred to or associated with that note. The user can also modify the title or content in a recent note, or add a title if one does not exist.

Referring to the main window 606, each notebook includes a note actions control 612 that contains various actions performable on the notebook. The control 612 may include, for example, a pull down menu containing a number of available options. For example, the note actions 612 can include adding entries, deleting notes, modifying entries, or merging entries with other entries, or notebooks. The user can select a notebook by selecting the text or any content within the confines of the notebook. Upon selection of a notebook, the user can make any additions, modifications, or deletions necessary to re-organize the notebook.

The user can organize the notebook entries in several different ways. For example, the user can organize the entries alphabetically, sequentially by date, or topically by category. The user can also organize the notebook entries by title, user, or a set of user-determined criteria. For example, a notebook may contain several brands of designer shoes, which can be organized by user-determined criteria, such as price, brand, color, occasion, or comfort. A user can select entries in the main window 606 and drag them up or down in the list in the main window 606 to re-order the entries or notes.

The user can select notebooks, notes, or entries, and drag them between the sidebar window 604, and the main window 606. As noted above, the pointer 616 has selected a recent entry 618 and begun to drag the entry into the sidebar window 604. The recent note 618 may have a graphical effect, such as a drop-shadow over the web page. The drop-shadow can be transparent or modified such that it is distinguished from a web page background, and is consistent with other user interface mechanisms with which the user is familiar.

The arrow 614 located adjacent to each entry can function as a drop down or selection device. For example, selection arrow 614 can expand or collapse a note to display or hide the contents of the note. In addition, the user can add material to the notes or notebooks, such as headings, ranking criteria, comments, annotations, and the like.

In some implementations, the notebook entries in the main window 606 can be displayed as icons, links, tabs, or graphic images related to the content included in the notebook. In addition, the notebook entries can be cascaded, tiled, minimized, maximized, closed or deleted altogether.

Figure 7:
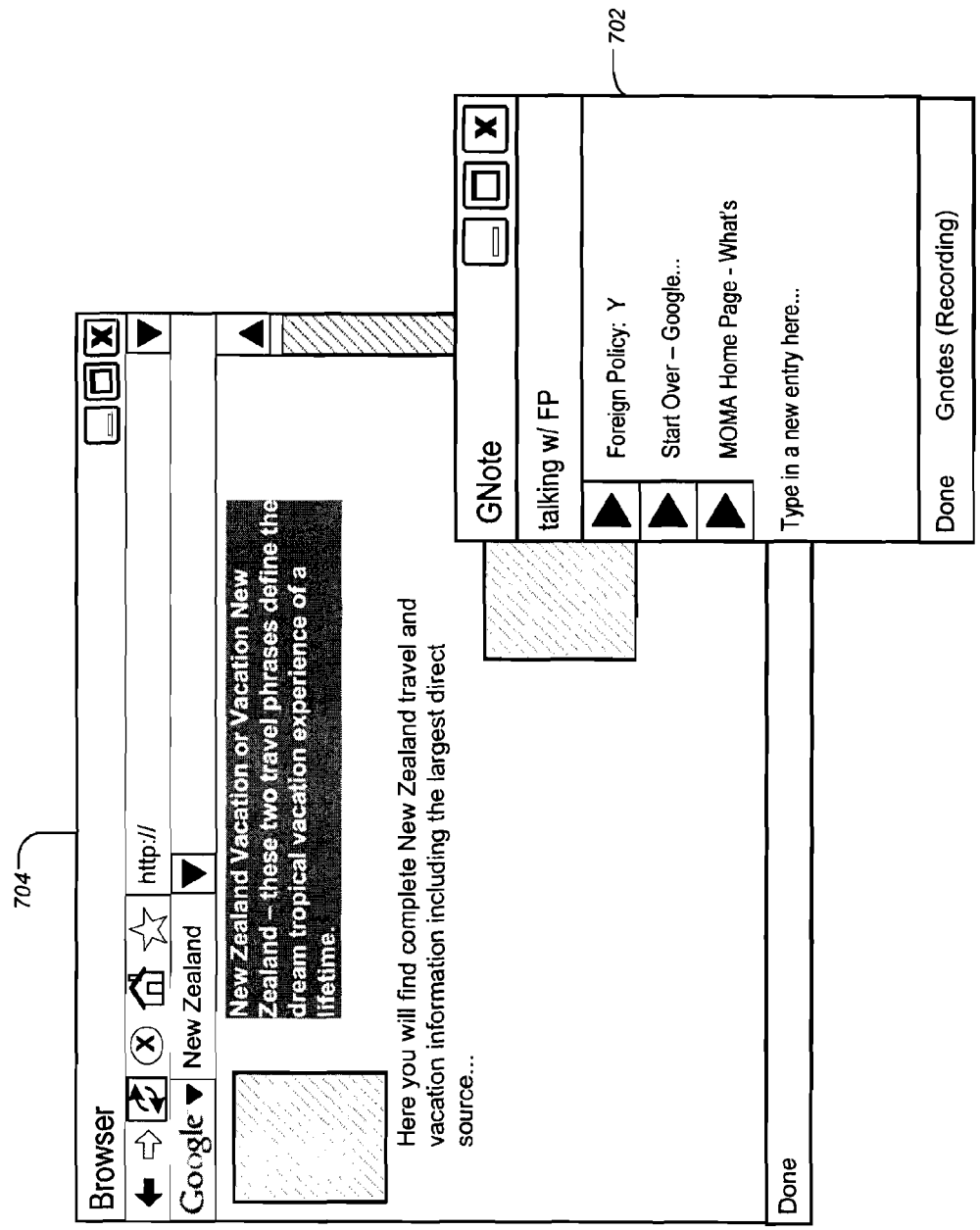
FIG. 7 is a simplified screen shot showing a web notebook surf-along window implementation.

FIG. 7 is a simplified screen shot showing a web notebook surf-along window implementation. In this example, the surf-along window 702 is in a separate operating system window from the browser 704. This implementation may be used, for example, when a client computer has not had particular code (such as a plug-in) installed for providing the surf-along window in the browser window 704. Although such an implementation may allow window 702 to fall behind window 704, the implementation may be more readily used on computers that do not belong to a user, and thus do not contain all of the user's preferred plug ins.

When the web notebook application is operated outside of plug-in mode, the user can be shown the application in a separate window. The user can perform the operations between the two windows as if the applications were nested. Other than the visual change in how the windows dock, the user may not see functionality changes between the plug-in mode and the separate window mode, to the extent the various functions may be implemented under both approaches. However, the code to perform operations can differ between the plug-in mode and the separate window mode. For example, when the user accesses a notebook web page in separate window mode, the server can use an external command, such as JavaScript's "window.open" command to open a new window containing the web notebook application 702. The command may be invoked when a user accesses a web page that exists in one of the notebooks on the client computer. Alternatively, the notebook can be invoked on a timed basis. For example, the web notebook application can be set to open several seconds after the web page loads. In another implementation, the notebook can be invoked when more than one search has been performed on the client computer, assuming that the user may wish to start saving results.

Figure 8:
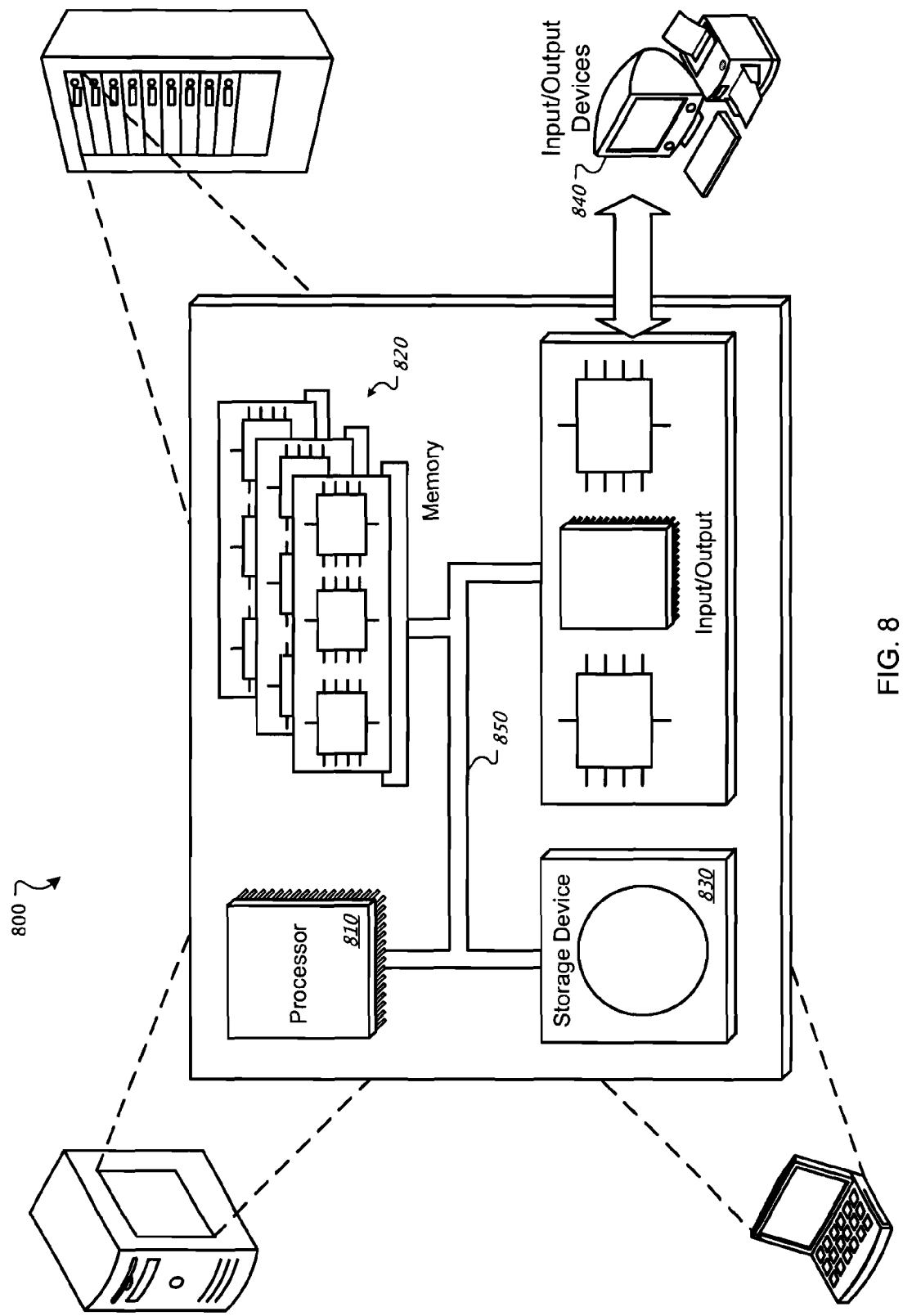
FIG. 8 is a block diagram of a computing device that may be used to implement the web notebook system.

FIG. 8 is a block diagram of a computing device 800 that may be used to implement the systems, methods and tools described in this document, as either a client or as a server(s), or a combination of the two. The computing device 800 is intended to represent various forms of digital devices, such as laptops, desktops, workstations, personal digital assistants, servers, blade servers, mainframes, or other appropriate computers or devices.

The computing device 800 includes a processor 810, memory 820, a storage device 830, and an input/output device 840 Each of the components 810, 820, 830, and 840, are interconnected using various busses 850, and may be mounted on a common motherboard or in other manners as appropriate. The processor 810 can process instructions for execution within the computing device 800, including instructions stored in the memory 820 or on the storage device 830 to display graphical information for a GUI on the input/output device 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information within the computing device 800. In one implementation, the memory 820 is a volatile memory unit or units. In another implementation, the memory 820 is a non-volatile memory unit or units. The memory 820 may also be another form of computer-readable medium, such as a magnetic or optical disk.

The storage device 830 is capable of providing mass storage for the computing device 800. In one implementation, the storage device 830 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 820, the storage device 830, or memory on processor 810.

A high speed controller manages bandwidth-intensive operations for the computing device 800, while a the low speed controller manages lower bandwidth-intensive operations. Such allocation of functions is exemplary only. In one implementation, the high-speed controller is coupled to memory 820, the input/output device 840 (e.g., through a graphics processor or accelerator), and to high-speed expansion ports, which may accept various expansion cards (not shown). In the implementation, low-speed controller is coupled to storage device 830 and a low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown. For example, the computing device 800 may be implemented as a standard server, or multiple times in a group of such servers. The computing device 800 may also be implemented as part of a rack server system. In addition, the computing device 800 may be implemented in a personal computer such as a laptop computer. Each of such devices may contain one or more of computing device 800 and an entire system may be made up of multiple computing devices 800 communicating with each other.

Figure 9:
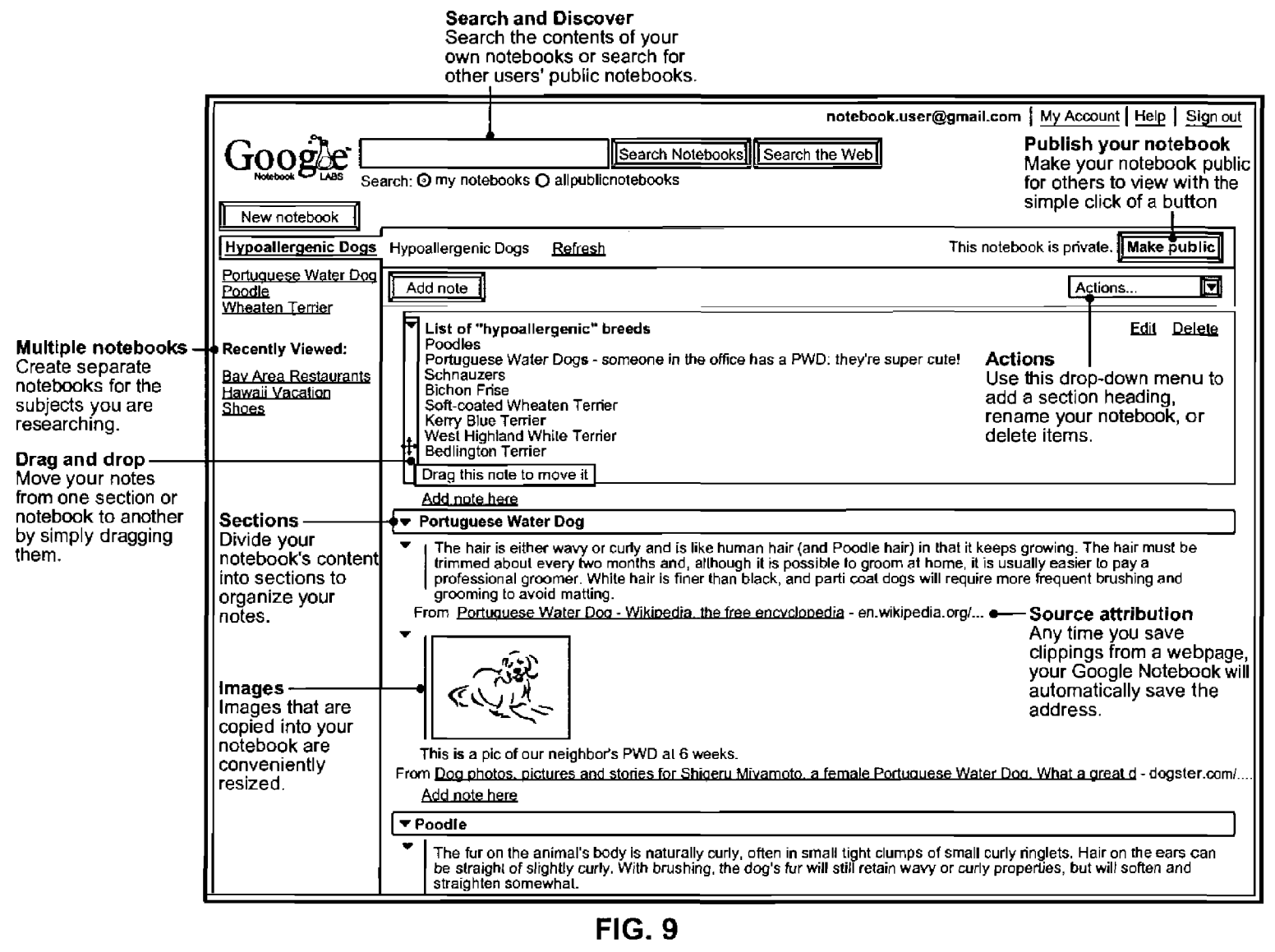

FIG. 9 is a screen shot of another example web notebook manager display. This screen shot is similar to the simplified screen shot in FIG. 6. Annotations are provided to aid in understanding the components shown on the screen. In general, a number of web notebooks authored by a user are shown along the left edge of the display, with a listing of web notebooks that the user has viewed recently. Selecting any of the listed links causes the corresponding notebook to be displayed. A note is shown in the hypoallergenic dogs notebook, and the note is shown bring dragged to another area. In particular, a movement cross is shown along a bar at the left edge of the note. Section headings are also provided for some areas of the notebook, such as the headings "Portuguese Water Dog" and "Poodle." In addition, links back to the originating source are provided. Such links can provide attribution to the original page, and can also allow the entry to lead back to the original web page.

In some implementations, as depicted at the top of FIG. 9, searches can be performed for notebook content. In particular, in some implementations, a search can be directed to either a particular user's notebooks (e.g., a user who has logged into a user account associated with the search interface, such as "notebook.user@gmail.com") or to all public notebooks. In other implementations, semi-private notebooks to which the current user has access (e.g., other users' notebooks that are designated as accessible to the current user) may also be searchable.

Figure 10:
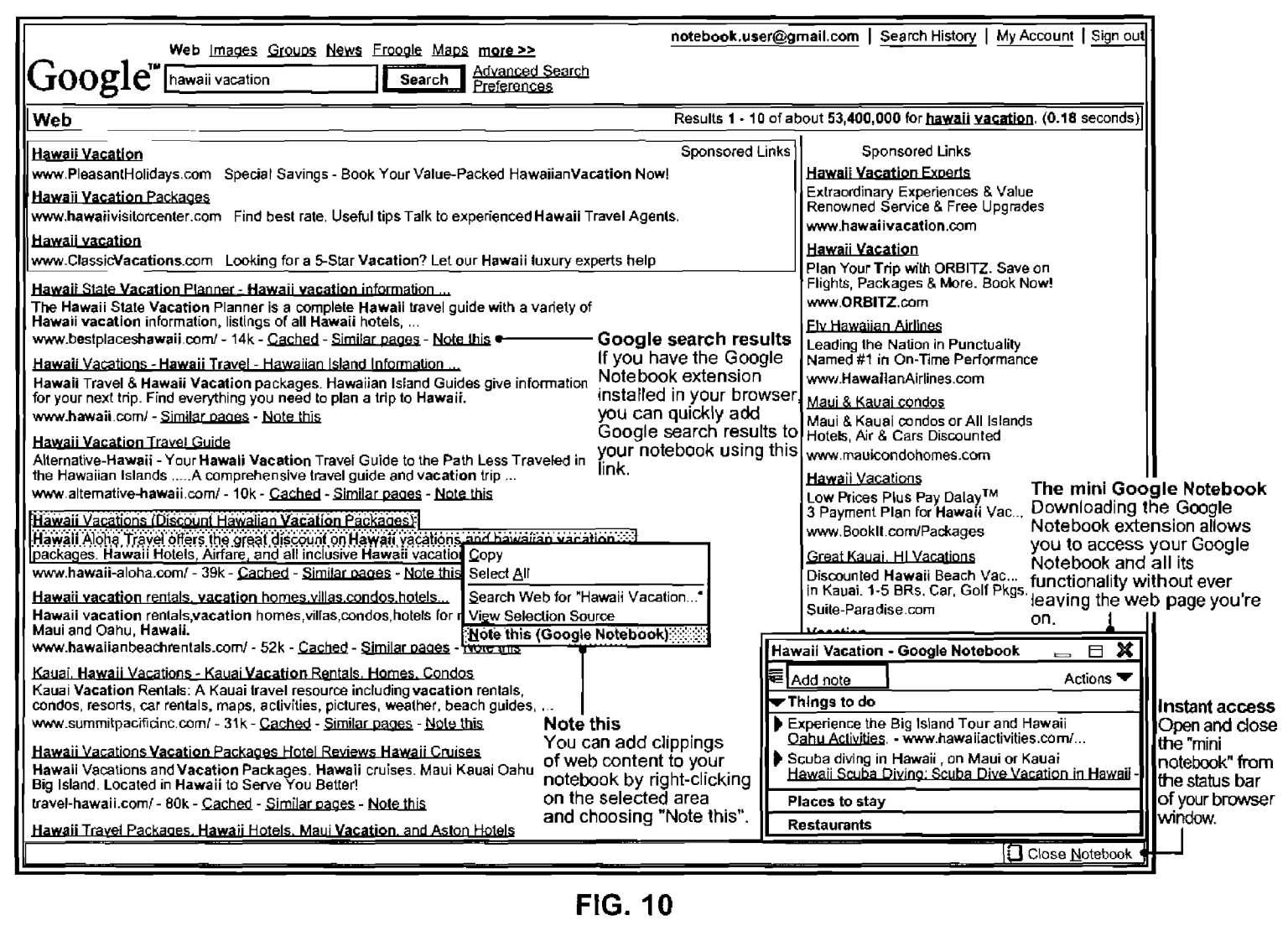

FIG. 10 is a screen shot showing a web notebook surf-along window implementation. This screen shot is displaying a mini-notebook, in combination with search results returned by a search engine. As shown, various controls are provided with the search results, including "Note This" links that permit a user to add particular search results to one of their notebooks, such as the notebook that is active in the surf-along window. Alternatively, the user may select content using the background application described above, or may, as shown in FIG. 10, select content and then right-click to be provided with a number of options. The screen also shows contextual or targeted advertisements, which may also be displayed and related to content in the other screen shots shown here.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. Although particular systems have been shown and discussed here, systems consistent with this document may include portions of the systems described or similar systems, such that sub-systems may also be considered to be systems.

A number of implementations have been described. Nevertheless, it will be understood that various modifications may be made without departing from the spirit and scope of the disclosed implementations. For example, various forms of the flows shown above may be used, with steps re-ordered, added, or removed. Also, although several applications of the page creating process and methods have been described, it should be recognized that numerous other applications are contemplated. Further, in some implementations, the server described above may implement the same effect on a selected image using an identical function as the browser. That is, the server may produce a blend that is identical to the blend produced by the browser. Alternatively, the server may implement the effect with a different algorithm or process, one that is not limited by the constraints that may be in place for the browser, thereby producing a better result that may be returned to the browser in response to command data (e.g., brightness data, enhancement data, etc.). Accordingly, other implementations are within the scope of the following claims.

What is claimed is:

1. A method of capturing data from a plurality of web documents, comprising:
    displaying a web document in a first web browser window;
    receiving a selection of content from within the displayed web document that is substantially less than all content in the displayed web document;
    displaying an embedded control in the first browser window in response to receiving the selection of content; and
    in response to input using the embedded control, automatically:
        comparing metadata associated with the selected content to metadata associated with content in a plurality of web notebooks to generate a plurality of scores, each score being associated with the selected content and content in a respective web notebook;
        selecting a web notebook from the plurality of web notebooks based on the comparing;
        copying the selected content to the selected web notebook; and
        displaying a web document portion associated with the selected content in the selected web notebook, the selected web notebook being displayed in an active content area of a second web browser window.

2. The method of claim 1, wherein the second browser window is a frame or region displayed within the first web browser window.

3. The method of claim 1, further comprising storing the selected content in a document with content from a plurality of web pages.

4. The method of claim 1, wherein the web document portion comprises one or more snippets of text contained in the selected content.

5. The method of claim 4, wherein the web document portion further comprises one or more images contained in the selected content.

6. The method of claim 4, further comprising displaying a web document connector comprising a link to the web document comprising the selected content.

7. The method of claim 1, further comprising displaying a plurality of web document portions, each associated with corresponding content selected from a different web document.

8. The method of claim 1, further comprising receiving a selection of a web document connector and displaying the selected content in response to the selection of the web document connector.

9. The method of claim 8, wherein displaying the selected content comprises displaying the selected content separately from the web document corresponding to the selected content.

10. The method of claim 8, wherein displaying the selected content comprises externally referencing up-to-date content from the web document corresponding to the selected content.

11. The method of claim 10, wherein externally referencing up-to-date content comprises analyzing pointers in a web notebook that is displayed in the second web browser window.

12. The method of claim 1, wherein selecting a web notebook from the plurality of web notebooks is performed based on the plurality of scores.

13. The method of claim 1, wherein the metadata associated with content in the plurality of web notebooks comprises one or more keywords, at least one keyword being assigned by a user that is associated with the plurality of web notebooks.

14. A system for capturing data from a plurality of web documents, comprising:
    one or more processors; and
    a computer-readable storage medium in communication with the one or more processors and having instructions stored thereon that, when executed by the one or more processors, cause the one or more processors to perform operations comprising:
        displaying a web document in a first web browser window;
        receiving a selection of content from within the displayed web document that is substantially less than all content in the displayed web document;
        displaying an embedded control in the first browser window in response to receiving the selection of content; and
        in response to input using the embedded control, automatically:
            comparing metadata associated with the selected content to metadata associated with content in a plurality of web notebooks to generate a plurality of scores, each score being associated with the selected content and content in a respective web notebook;
            selecting a web notebook from the plurality of web notebooks based on the comparing;
            copying the selected content to the selected web notebook; and
            displaying a web document portion associated with the selected content in the selected web notebook, the selected web notebook being displayed in an active content area of a second web browser window.

15. The system of claim 14, wherein the second browser window is a frame or region displayed within the first web browser window.

16. The system of claim 14, wherein the operations further comprise storing the selected content in a document with content from a plurality of web pages.

17. The system of claim 14, wherein the web document portion comprises one or more snippets of text contained in the selected content.

18. The system of claim 17, wherein the web document portion further comprises one or more images contained in the selected content.

19. The system of claim 17, wherein the operations further comprise displaying a web document connector comprising a link to the web document comprising the selected content.

20. The system of claim 14, further comprising displaying a plurality of web document portions, each associated with corresponding content selected from a different web document.

21. The system of claim 14, further comprising receiving a selection of a web document connector and displaying the selected content in response to the selection of the web document connector.

22. The system of claim 21, wherein displaying the selected content comprises displaying the selected content separately from the web document corresponding to the selected content.

23. The system of claim 21, wherein displaying the selected content comprises externally referencing up-to-date content from the web document corresponding to the selected content.

24. The system of claim 23, wherein externally referencing up-to-date content comprises analyzing pointers in a web notebook that is displayed in the second web browser window.

25. A computer-readable storage medium in communication with one or more processors and having instructions stored thereon that, when executed by the one or more processors, cause the one or more processors to perform operations comprising:
    displaying a web document in a first web browser window;
    receiving a selection of content from within the displayed web document that is substantially less than all content in the displayed web document;
    displaying an embedded control in the first browser window in response to receiving the selection of content; and
    in response to input using the embedded control, automatically:
        comparing metadata associated with the selected content to metadata associated with content in a plurality of web notebooks to generate a plurality of scores, each score being associated with the selected content and content in a respective web notebook;
        selecting a web notebook from the plurality of web notebooks based on the comparing;
        copying the selected content to the selected web notebook; and
        displaying a web document portion associated with the selected content in the selected web notebook, the selected web notebook being displayed in an active content area of a second web browser window.

26. The computer-readable storage medium of claim 25, wherein the second browser window is a frame or region displayed within the first web browser window.

27. The computer-readable storage medium of claim 25, wherein the operations further comprise storing the selected content in a document with content from a plurality of web pages.

28. The computer-readable storage medium of claim 25, wherein the web document portion comprises one or more snippets of text contained in the selected content.

29. The computer-readable storage medium of claim 28, wherein the web document portion further portion comprises one or more images contained in the selected content.

30. The computer-readable storage medium of claim 28, wherein the operations further comprise displaying a web document connector comprising a link to the web document comprising the selected content.

31. The computer-readable storage medium of claim 25, further comprising displaying a plurality of web document portions, each associated with corresponding content selected from a different web document.

32. The computer-readable storage medium of claim 25, further comprising receiving a selection of a web document connector and displaying the selected content in response to the selection of the web document connector.

33. The computer-readable storage medium of claim 32, wherein displaying the selected content comprises displaying the selected content separately from the web document corresponding to the selected content.

34. The computer-readable storage medium of claim 32, wherein displaying the selected content comprises externally referencing up-to-date content from the web document corresponding to the selected content.

35. The computer-readable storage medium of claim 34, wherein externally referencing up-to-date content comprises analyzing pointers in a web notebook that is displayed in the second web browser window.

* * * * *

UNITED STATES PATENT AND TRADEMARK OFFICE
CERTIFICATE OF CORRECTION

| | |
|---|---|
| PATENT NO. | : 8,255,819 B2 |
| APPLICATION NO. | : 11/747169 |
| DATED | : August 28, 2012 |
| INVENTOR(S) | : Bay-Wei Chang et al. |

It is certified that error appears in the above-identified patent and that said Letters Patent is hereby corrected as shown below:

Column 28, line 19, claim 29, after "further" delete "portion" --, therefore.

Signed and Sealed this
Thirtieth Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,255,819 B2 | Page 1 of 1 |
| APPLICATION NO. | : 11/747169 | |
| DATED | : August 28, 2012 | |
| INVENTOR(S) | : Chang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this
Twenty-ninth Day of December, 2015

Michelle K. Lee
*Director of the United States Patent and Trademark Office*